US005737128A

United States Patent [19]

Usui

[11] Patent Number: 5,737,128
[45] Date of Patent: Apr. 7, 1998

[54] ZOOM LENS DEVICE WITH INNER FOCUSING METHOD

[75] Inventor: Fumiaki Usui, Kawasaki, Japan

[73] Assignee: Canon Kabushiki Kaisha, Tokyo, Japan

[21] Appl. No.: 665,234

[22] Filed: Jun. 17, 1996

[30] Foreign Application Priority Data

Jun. 22, 1995 [JP] Japan .................... 7-156141

[51] Int. Cl.$^6$ .................................... G02B 15/14
[52] U.S. Cl. ............... 359/686; 359/684; 359/687; 359/688
[58] Field of Search .................... 359/684, 686–688

[56] References Cited

U.S. PATENT DOCUMENTS

| 4,099,845 | 7/1978 | Takesi et al. | 350/184 |
| 4,110,006 | 8/1978 | Ikemori | 350/186 |
| 4,113,356 | 9/1978 | Matsubara | 350/186 |
| 4,752,121 | 6/1988 | Kitagishi | 350/427 |
| 4,848,883 | 7/1989 | Maruyama | 359/684 |

FOREIGN PATENT DOCUMENTS

| 52-109952 | 9/1977 | Japan . |
| 52-128153 | 10/1977 | Japan . |
| 52-41068 | 10/1977 | Japan . |
| 55-57815 | 4/1980 | Japan . |
| 55-117119 | 9/1980 | Japan . |
| 59-4686 | 1/1984 | Japan . |
| 61-53696 | 11/1986 | Japan . |

*Primary Examiner*—David C. Nelms
*Assistant Examiner*—Evelyn A. Lester
*Attorney, Agent, or Firm*—Fitzpatrick, Cella, Harper & Scinto

[57] ABSTRACT

A zoom lens device including in order of lens units from the lens unit closest to an object side of the zoom lens device to an image side of the zoom lens device, a first lens unit having a positive refractive power, a second lens unit for changing magnification and having a negative refractive power, a third lens unit for correcting changes in an image plane which occur as the magnification changes, and a fourth lens unit for forming an image. The first lens unit includes (i) a front lens subunit which is stationary during focusing and which has a positive refractive power and (ii) a rear lens subunit which is movable in order to bring an object into focus. The front lens subunit includes a negative lens and a positive lens. The rear lens subunit includes a negative lens and at least two positive lenses.

20 Claims, 34 Drawing Sheets

SPHERICAL ABERRATION

ASTIGMATISM

DISTORTION (%)

f no/1.7

-0.40  0.40
SPHERICAL
ABERRATION

W=17°

ΔM  ΔS

-0.40  0.40
ASTIGMATISM

W=17°

-10.00  10.00
DISTORTION (%)

fno/1.7

-0.40    0.40
SPHERICAL
ABERRATION

W=8.7°

-0.40    0.40
ASTIGMATISM

W=8.7°

-10.00    10.00
DISTORTION (%)

fno/1.7

-0.40  0.40
SPHERICAL
ABERRATION

W=4.4°

ΔS  ΔM

-0.40  0.40
ASTIGMATISM

W=4.4°

-10.00  10.00
DISTORTION (%)

FIG. 10A
FIG. 10B
FIG. 10C
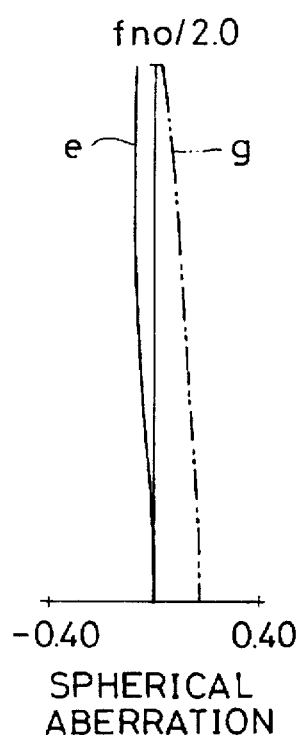
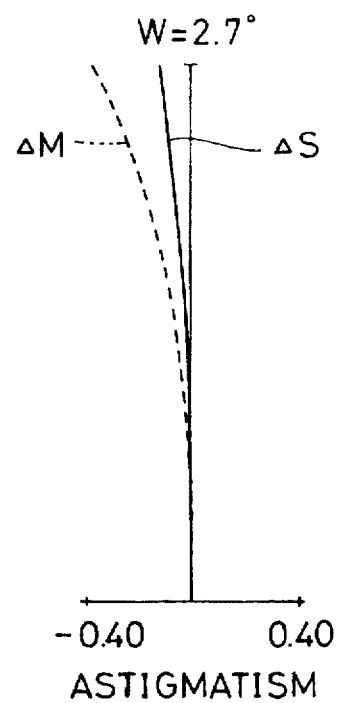
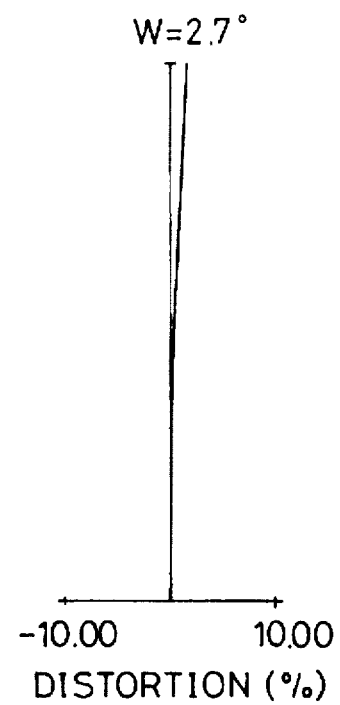

fno/1.7

-0.40　　0.40
SPHERICAL
ABERRATION

W=17.9°

-0.40　　0.40
ASTIGMATISM

W=17.9°

-10.00　　10.00
DISTORTION (%)

fno/1.7

-0.40  0.40
SPHERICAL
ABERRATION

W=9.2°

-0.40  0.40
ASTIGMATISM

W=9.2°

-10.00  10.00
DISTORTION (%)

FIG. 16A
FIG. 16B
FIG. 16C
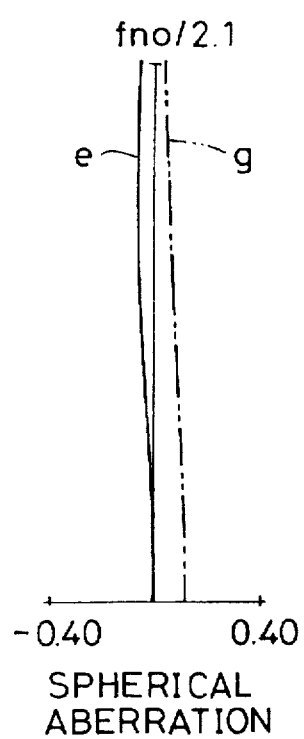
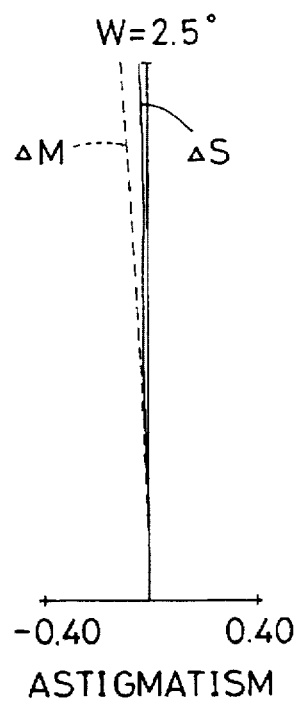
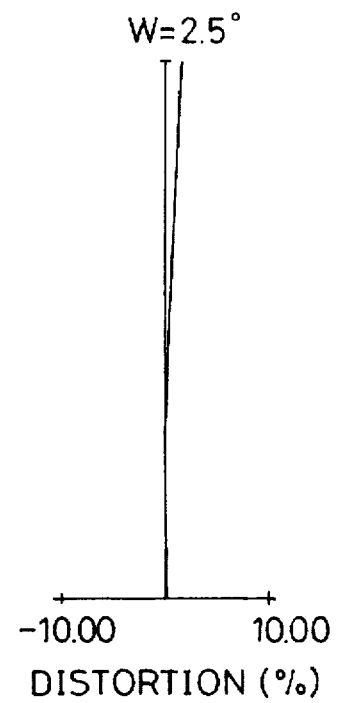

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

FIG. 23A
FIG. 23B
FIG. 23C
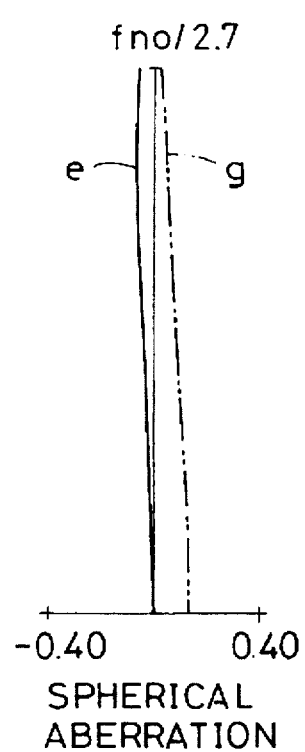
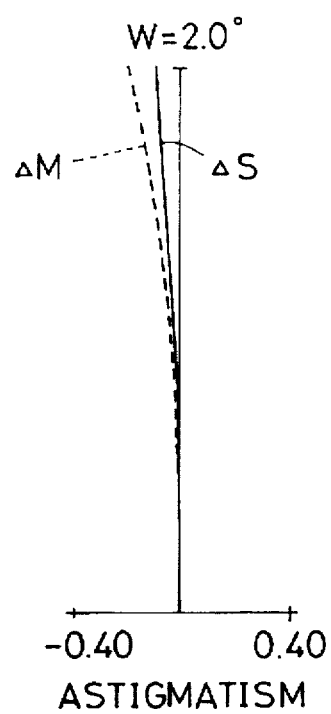
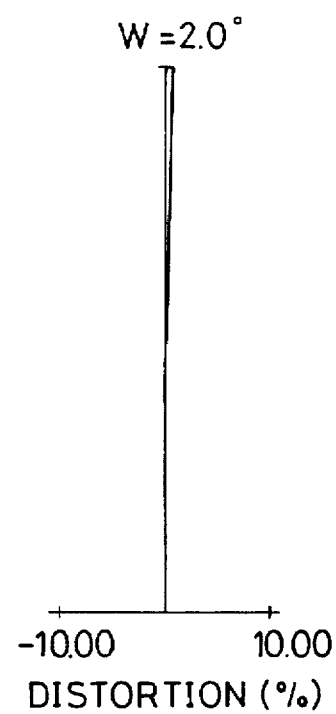

SPHERICAL ABERRATION

ASTIGMATISM

DISTORTION (%)

FIG. 25A
FIG. 25B
FIG. 25C
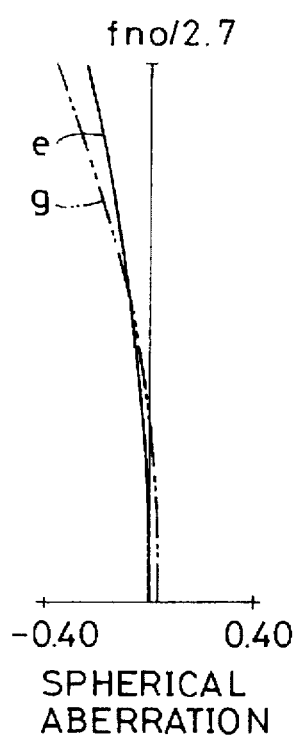
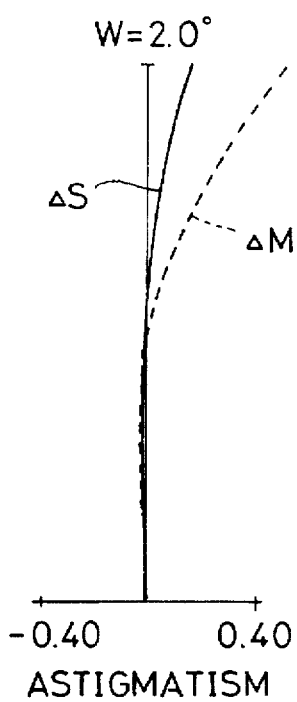
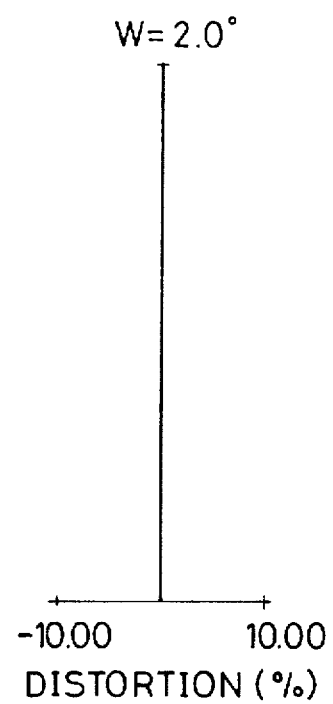

SPHERICAL ABERRATION

ASTIGMATISM

DISTORTION (%)

fno/1.8

-0.40　　0.40
SPHERICAL
ABERRATION

W=15.8°

-0.40　　0.40
ASTIGMATISM

W=15.8°

-10.00　　10.00
DISTORTION (%)

fno/1.8 e — -g

-0.40    0.40
SPHERICAL
ABERRATION

W=4.5°

-0.40    0.40
ASTIGMATISM

W=4.5°

-10.00    10.00
DISTORTION (%)

SPHERICAL ABERRATION

ASTIGMATISM

DISTORTION (%)

SPHERICAL ABERRATION

ASTIGMATISM

DISTORTION (%)

AT INFINITY

AT M.O.D.

AT INFINITY

AT M.O.D.

ZOOM LENS DEVICE WITH INNER FOCUSING METHOD

BACKGROUND OF THE INVENTION

1. Field of the Invention

The present invention broadly relates to a zoom lens device suitable for use in a television camera, video camera, photographic camera, etc., and, more particularly, to a zoom lens device utilizing the so-called inner focusing method in which focusing is performed by part of the first lens unit, and having a wide angle, a large aperture with an f-number of 1.7, and a high magnification change ratio with a zoom ratio of from about 13 to 44.

2. Description of the Related Art

Hitherto, smaller television cameras have caused an increasing demand for lens systems with an overall smaller size, a larger aperture ratio, and a higher magnification change ratio.

In a zoom lens device in which an object is brought into focus by a lens unit located closer to the object than a zooming lens unit, zooming and focusing can be performed separately, so that the moving structure can be simplified and an object can be brought into focus at a constant distance by moving in and out the focus lens unit by a constant amount regardless of the zooming position, without any movement in the focus point caused by zooming.

Japanese Patent Publication No. 59-4686 discloses such a zoom lens device utilizing the so-called inner focusing method. This zoom lens device comprises four lens units. They are, starting from the lens unit closest the object, a first lens unit (focusing lens unit) with a positive refractive power, a second lens unit (zooming lens unit) with a negative refractive power, a third lens unit (correcting lens unit for correcting the image plane that changes due to zooming) with a positive or negative refractive power, and a fourth lens unit for image formation (relay lens unit) with a positive refractive power. A stop is also provided in the zoom lens device. In the inner focusing method, a lens unit in the first lens unit is moved.

In the same document, the first lens unit (focusing lens unit) is composed of three lens units, an eleventh lens unit with a negative refractive power, a twelfth lens unit with a positive refractive power, and a thirteenth lens unit with a positive refractive power. When the focusing object distance changes from infinity to a close distance, the twelfth lens unit is moved toward the image plane.

In the zoom lens device disclosed in Japanese Patent Laid-Open Nos. 52-109952, 55-57815, and 55-117119, and Japanese Patent Publication Nos. 61-53696 and 52-41068, etc., the first lens unit of the zoom lens device (the zoom lens device consisting of four lens units) is divided into a plurality of lens units, of which the one closest to the object is stationary during focusing and a lens unit located behind the stationary lens unit nearer the image plane is moved during focusing.

In the zoom lens device disclosed in Japanese Patent Laid-Open No. 52-128153, the first lens unit is divided into two lens units which are separated apart. When the focusing object distance changes from infinity to a finite distance, the two lens units are moved away from each other in order to bring the object into focus.

In general, a zoom lens device of the inner focusing type has, for example, the following advantages. Compared to the zoom lens device that brings an object into focus by moving the entire first lens unit, the effective diameter of the first lens unit is smaller, making it easier to reduce the size of the entire lens system and to perform shooting at a close, and particularly a very close, distance. In addition, the lens unit which is moved is relatively compact and lightweight, so that only a small driving force is required to move it, making it possible to achieve quick focusing. A related document is Ser. No. 196459 (Feb. 15, 1994) by the present assignor.

In order to produce a zoom lens device having a large aperture ratio (for example, an f-number of from 1.7 to 3.3), and a high zoom ratio of approximately in the range of from 13 to 44, and good optical properties within the entire zooming range and focusing range, each lens unit must be made to have the proper refractive power and achromatizing capability, and be arranged properly.

In general, in order to obtain a zoom lens device with a good optical property characterized by small changes in aberration within the entire range of zooming and focusing, it is necessary, for example, to either reduce the refractive power of each lens unit in order to reduce aberration caused by each lens unit or to use more lenses in each lens unit to increase the number of ways chromatic aberration can be corrected. Therefore, when an attempt is made to produce a zoom lens device with a large aperture and a high zoom ratio, the air gap between each lens unit inevitably gets larger. In addition, the lens system becomes larger and heavier when more lenses are used to correct chromatic aberration.

In recent years, there has been a demand for zoom lens devices for use in broadcasting with a wider angle and a high zoom ratio, as well as better close distance optical properties or a smaller minimum shooting distance or minimum object distance (M.O.D), which is an important factor for satisfying specification requirements and for image effect.

However, it has been very difficult to preserve the optical properties of such a zoom lens device used for broadcasting because of large changes in the various aberrations due to focusing, particularly spherical aberration, axial chromatic aberration, and astigmatism. In general, changes in aberration tend to be large, the larger the focal length, the smaller the f-number, the larger the aperture ratio, and the smaller the M.O.D. are. The zoom lens device utilizing the above-described focusing method, disclosed in Japanese Patent Laid-Open Nos. 52-109952, 55-57815, and 55-117119, has a large number of lenses in the first lens unit, resulting in a larger, complicated, and heavy lens system.

In the zoom lens device disclosed in Japanese Patent Publication No. 61-53696, the first lens unit has a relatively simple construction, but there is a large air gap between the first lens unit and the zooming lens unit when an object at infinity is brought into focus, and the focusing lens unit with negative refractive power is moved toward the image surface when an object at a close distance is being brought into focus, resulting in a larger non-axial ray height at the wider angle side of the first lens unit, and a larger lens system.

In the zoom lens device in which the first lens unit is moved in and out, the structure of the first lens unit is relatively simple so that it can be readily reduced in size, but large changes in aberration, particularly spherical aberration and axial chromatic aberration occur. For example, as the focusing object becomes closer, the spherical aberration and thus the axial chromatic aberration is under-aberration.

A description will now be given of the mechanism in which changes in aberration occur in such a case.

FIG. 33 is illustrative of a paraxial system in the case where the first lens unit is composed of an eleventh lens subunit L11 with a negative refractive power and a twelfth lens subunit L12 with a positive refractive power. FIGS. 34(A) and 34(B) are cross section views of a typical first lens unit L1 in a four lens unit zoom lens device.

Referring to FIG. 33, the solid vertical lines represent the positions of the lens subunits when an object at infinity is focused, and the dotted vertical lines represent their positions when an object at M.O.D. is in focus. A paraxial ray of an object at infinity brought to a focus is represented by the solid line, and a paraxial ray of an object at M.O.D brought to a focus is represented by the dotted lines. When ha and hb represent, respectively, the height of the solid line paraxial ray incident to the eleventh lens subunit and twelfth lens subunit, and α represents the inclination thereof between the eleventh and twelfth lens subunits; and when ha', hb' represent the height of the dotted line paraxial ray incident to the eleventh and twelfth lens subunits and α' represents the inclination thereof between the eleventh and twelfth lens subunits, then α'<α, so that:

$$hb-ha<hb'-ha'.$$

According to the third-order aberration theory, the third-order axial chromatic aberration constant L is proportional to the square of the paraxial ray height h, and the third-order spherical aberration constant I is proportional to the paraxial ray height h raised to the fourth power. In this focusing method, the coefficient L is larger in the positive direction during M.O.D. focusing than during focusing at infinity, causing the axial chromatic aberration to be under-aberration. Similarly, the coefficient I is larger in the positive direction, causing the spherical aberration to be under-aberration.

In the zoom lens device disclosed in Japanese Patent Publication No. 52-41068, the first lens unit is divided into two lens subunits, as shown in FIGS. 36(A) and 36(B), of which the 11th lens subunit L11, closer to the object and having virtually no negative refractive power, is stationary, and the 12th lens subunit L12, closer to the image surface and having a positive refractive power, is moved in order to bring an object into focus.

FIG. 35 illustrates a paraxial system of the 11th and twelfth lens subunits. In the figure, the movement of the 12th lens subunit is represented by the movement of its principal point.

The solid line represents a paraxial ray of an object at infinity brought to a focus, and the dotted lines represent a paraxial ray of an object at M.O.D. brought to a focus. When hf and hm represent, respectively, the height of the solid line paraxial ray incident to the eleventh and twelfth lens subunits and hf' and hm' represent, respectively, the height of the dotted line paraxial ray incident to the eleventh and twelfth lens subunits, then:

$$hb-ha<hm-hf,$$

and $$hb'-ha'<hm'-hf'.$$

Consequently, compared to the zoom lens device in which the first lens unit is moved in and out, it is possible to reduce changes in the third-order spherical aberration coefficients I and the axial chromatic aberration coefficients L of the zoom lens device of the present document, over the focusing distance of from infinity to M.O.D. Therefore, compared to the zoom lens device in which the first lens unit is moved in and out, it is possible to reduce changes in spherical aberration and axial chromatic aberration caused by focusing.

However, the changes in the aberration are not small enough, resulting in a demand for a zoom lens device with a sufficiently small aberration.

In the zoom lens device disclosed in Japanese Patent Laid-Open No. 52-128153, the first lens unit consists of two lens subunits, both of which are moved during focusing so that the distance between the two lenses gets larger as the focusing object becomes closer, whereby primarily the lens performance at the sections around the center are enhanced. According to an embodiment of that document, however, when an object at a close distance is brought into focus, the spherical aberration is under-aberration, which has the opposite effect of leading to poorer lens performance at the center.

In addition, in order to respond to the recent demand for a smaller and lighter weight zoom lens device with a higher performance, it is, in general, necessary for each lens unit to have the proper refractive power and to be properly arranged. In particular, in the four lens unit zoom lens device, the refractive power and brightness of the first lens unit are important factors that greatly affect the size and weight of the entire lens system.

In order for the zoom lens device used in high-definition broadcasting to have high optical properties over the entire zooming and focusing ranges, changes in aberration, particularly, at the telephoto side of the zoom lens device that are caused by focusing must be kept to a low value. Changes in aberration, in particular axial chromatic aberration and chromatic aberration of magnification, as well as the absolute values of the amount of aberration must be kept to a low value as much as possible in order to obtain high resolving power. Thus, the construction of the first lens unit is very important because it largely determines the amount of aberration at the telephoto end and the aberration caused by focusing. A related application is Serial No. 196459 (Feb. 15, 1994) by the present assignor.

SUMMARY OF THE INVENTION

Accordingly, an object of the present invention is to provide a zoom lens device of the four lens unit type utilizing the so-called inner focusing method in which an object is brought into focus by moving part of the first focusing lens unit along the optical axis. Another object of the present invention is to provide a zoom lens device having excellent optical properties over the entire zooming and focusing ranges, which is achieved by properly arranging each lens unit in order to realize a larger aperture and higher magnification change, whereby changes in the various aberrations such as spherical aberration and chromatic aberration that occur as a result of zooming and focusing are reduced. A further object of the present invention is to provide a zoom lens device having a wide angle, a large aperture ratio with an f-number of about 1.7 and a high magnification change ratio with a zoom ratio of in the range of about 13 to 44.

In view of the foregoing, in one aspect, the present invention relates to a zoom lens device comprising in order of lens units from the lens unit closest to an object side of said zoom lens device to an image side of said zoom lens device, a first lens unit having a positive refractive power, a second lens unit for changing magnification and having a negative refractive power, a third lens unit for correcting changes in an image plane which occur as the magnification changes, and a fourth lens unit for forming an image. The first lens unit comprises (i) a front lens subunit which is stationary during focusing and which has a positive refractive power and (ii) a rear lens subunit which is movable in order to bring an object into focus. The front lens subunit comprises a negative lens and a positive lens. The rear lens subunit comprises a negative lens and at least two positive lenses.

In another aspect, the present invention relates to a zoom lens comprising in order from object side to image side of the zoom lens, a first lens unit having a positive refractive power, a second lens unit for changing magnification and having a negative refractive power, a third lens unit for correcting changes in an image plane which occur as the magnification changes, and a fourth lens unit for forming an image. The first lens unit comprises (i) a front lens subunit which is stationary during focusing and (ii) a rear lens subunit which is movable for focusing. The front lens subunit comprises a negative lens and a positive lens, and the rear lens subunit comprises a negative lens and two positive lenses.

To this end, there is provided according to the present invention a zoom lens composed of four lens units. They are starting from the lens unit nearest the object, a first lens unit having a positive refractive power, a second lens unit used for magnification change and having a negative refractive power, a third lens unit used for correcting for changes in the image plane that occur as changes in the magnification take place, and a fourth lens unit used for forming an image. In the zoom lens, the first lens unit is composed of a front lens subunit that is stationary during focusing and a rear lens subunit that moves toward the object during focusing when the focusing object distance changes from infinite distance to a close distance. The front lens subunit is composed of at least two separate lenses, at least one negative lens LN11 and at least one positive lens LP12. The rear lens subunit is composed of at least one negative lens LN21 positioned as the first or second lens within the rear lens subunit from the object and at least two positive lenses. When the focal length of the rear lens subunit is Fc12, the Abbe constants of the materials of the negative lens LN11 and the positive lens LP12 are $v_{11N}$ and $v_{12P}$, respectively, and the focal length of the negative lens LN21 and the Abbe constant of the material thereof are F21 and $v_{21N}$, respectively, the following Conditions (1) to (3) are satisfied:

$$v_{11N} - v_{12P} < -55 \quad (1)$$

$$v_{11N} - v_{21N} < -10 \quad (2)$$

$$-6.5 < F21/Fc12 < -3.5 \quad (3)$$

In addition, in the present invention when, among the indices of refraction of the material of the negative lens LN21, those in terms of the d line with a wavelength of 587.56 nm, the g line with a wavelength of 435.83 nm, the F line with a wavelength of 486.13 nm, and the C line with a wavelength of 656.27 nm are nd, ng, nF, and nC, respectively, Condition (4) is satisfied:

$$Pgd = (ng - nd)/(nF - nC) < 1.36 - 0.00208 \times v_{21N} \quad (4)$$

Further, in the present invention when the radii of curvature of the negative lens LN21 of the rear lens subunit at the object side and the image side are ra and rb, respectively, Condition 5 is satisfied:

$$1.1 < \left| \frac{r_b + r_a}{r_b - r_a} \right| < 5.6 \quad (5)$$

Still further, in the present invention when the focal length and the f-number of the entire system at the telephoto end are FT and FNT, respectively, and when the focal length of said first lens unit is F1, Conditions 6 and 7 are satisfied:

$$1.0 < FN1 < 1.7 \quad (6)$$

(where FN1=F1/(FT/FNT))

$$0.9 < Fc12/F1 < 1.1 \quad (7)$$

Still further, in the present invention when the focal length of an ith lens of the aforementioned eleventh lens subgroup and the Abbe constant of material are f11i and v11i, respectively, and the focal length of an ith lens of the aforementioned twelfth lens subgroup are f12i and v12i, respectively, the following conditions are satisfied:

$$-2.5 \times 10^{-4} < EF \leq 0 \quad (8)$$

$$\left( \text{where } EF = \Sigma \frac{1}{f11i \times v11i} \right)$$

$$0 \leq EM < 2.4 \times 10^{-4} \quad (9)$$

$$\left( \text{where } EF = \Sigma \frac{1}{f12i \times v12i} \right)$$

$$-1.28 < EF/EM < -0.75 \quad (10)$$

The above and other objects, features, and advantages of the present invention will become clear from the following description of the preferred embodiments when the same is read in conjunction with the accompanying drawings.

BRIEF DESCRIPTION OF THE DRAWINGS

FIGS. 10A, 10B, and 10C illustrate graphs showing different aberrations in the first numerical example of the present invention, when the focal length f=117.0 and the object distance=infinity.

FIGS. 16A, 16B, and 16C illustrate graphs showing different aberrations in the second numerical example of the present invention, when the focal length f=127.5 and the object distance=3.0 m.

FIGS. 23A, 23B, and 23C illustrate graphs showing different aberrations in the third numerical example of the present invention, when the focal length f=160.0 and the object distance=3.0 m.

FIGS. 25A, 25B, and 25C illustrate graphs showing different aberrations in the third numerical example of the present invention, when the focal length f=160.0 and the object distance=0.9 m.

DESCRIPTION OF THE PREFERRED EMBODIMENTS

Figure 1:
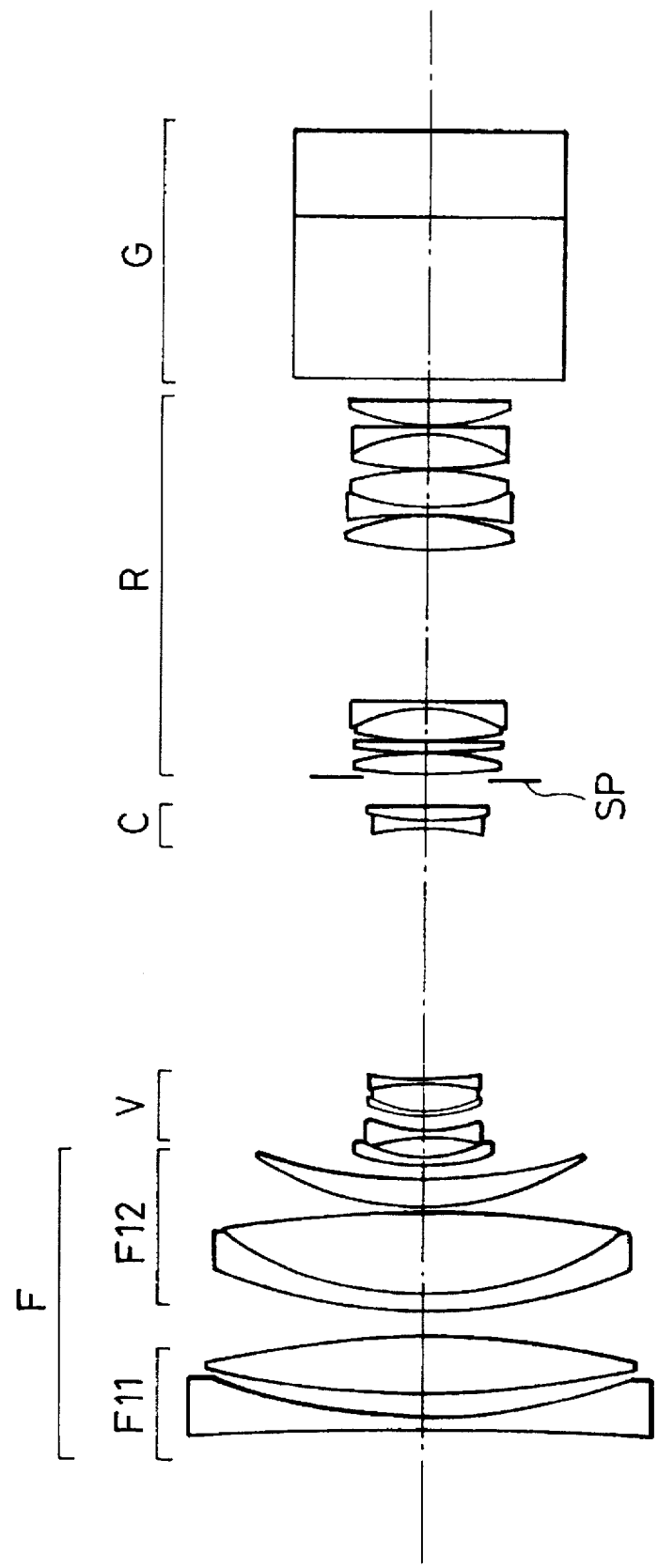
FIG. 1 is a cross sectional view of a lens with a wide angle of a first numerical example in accordance with the present invention.

FIGS. 1, 2, 3, and 4 are each cross sectional views of a wide angle lens of a first, second, third, and fourth numerical examples of the present invention, respectively, wherein the object and image sides are on the left and right of the figures, respectively. FIGS. 5A to 11C each illustrate graphs showing different aberrations of the first numerical example of the present invention. FIGS. 12A to 18C each illustrate graphs showing different aberrations of the second numerical example of the present invention. FIGS. 19A to 25C each illustrate graphs showing different aberrations of the third numerical example of the present invention. FIGS. 26A to 32C each illustrate graphs showing different aberrations of the fourth numerical example of the present invention.

Referring to FIGS. 1 to 4, reference character F denotes a first lens unit with a positive refractive power and which is composed of two lens subunits, a stationary front lens subunit F11 and a movable focusing rear lens subunit F12 with a positive refractive power. The front lens subunit F11 is composed of at least one negative refractive power lens LN11 and at least one positive refractive power lens LP12, the two lenses being separate lenses. The rear lens subunit F12 is composed of at least one negative refractive power lens LN21 being the first or second lens within rear lens subunit F12 from the object and at least two positive refractive power lenses. The rear lens subunit F12 is moved toward the object when the focusing object distance changes from infinite distance to a close distance.

Reference character V denotes a variator, which is a second lens unit, with a negative refractive power and which is used for zooming. The variator is monotonically moved along the optical axis toward the image surface in order to achieve zooming from the wide angle end to the telephoto end. The second lens unit V changes the magnification within a range including an imaging magnification of real size (or −1×).

Reference character C denotes a compensator, which is a third lens unit, with a positive or negative refractive power and which is moved to correct changes in the image plane as zooming is performed. Reference character SP denotes a stop and reference character R denotes a relay unit, being a fourth lens unit, with a positive refractive power. Reference character G denotes a color-separating prism, an optical filter, etc., and is represented by a glass block in the figures.

In general, in a zoom lens device composed of four lens units that performs focusing by moving the entire lens unit located closest to the object, the first lens unit is moved in and out by a constant amount for an object at the same distance for each focal length, thereby simplifying the structure of the lens barrel.

In focusing on a nearby object with a wide angle using a zoom lens device composed of a first lens unit having a positive refractive power and a wide field angle, the effective diameter of the first lens unit increases because the first lens unit is moved toward the object in order to obtain non-axial luminous flux. In addition, a higher driving torque is required because the first lens unit which is moved is relatively heavy, making it difficult to achieve quick focusing of an object.

Accordingly, the zoom lens device having the above-described construction and satisfying the above-described conditions or formulas utilizes the inner focusing method in order to prevent the effective diameter of the first lens unit F from becoming large, so that the overall size of the lens system as well as the M.O.D can be reduced. In the inner focusing method, the rear lens subunit F12, positioned such that an object at infinity is in focus, is moved toward the object with the front lens subunit F11 being stationary in order to bring a nearby object into focus.

The stationary front lens subunit F11 is composed of, starting from the lens nearest the object, at least one negative lens LN11 and at least one positive lens LP12, with the negative lens LN11 and the positive lens LP12 being separated by a relatively small space.

In the stationary front lens subunit F11, the difference between the Abbe constants of the materials that form the negative lens LN11 and positive lens LP12 is made large in accordance with Condition (1). The difference in the Abbe constants of the negative lens LN11 of the front lens subunit and negative lens LN21 of the rear lens subunit is set in accordance with Condition (2) such that the Abbe constant of the negative lens LN21 is large. Setting the Abbe constants thus properly corrects for changes in chromatic aberration caused by zooming or focusing.

The negative lens LN11 and the positive lens LP12 are not combined, but separated by a relatively small space. The space between the lenses LN11 and LP12, or the so-called air lens, is defined by the radius of curvature of the negative lens LN11 face at the image surface side and the radius of curvature of the positive lens LP12 face at the object side. The boundary of the air lens at the object side is in the form of a convex-shaped positive meniscus lens with a substantially equal radius of curvature.

Advantages of the air lens include the following:

(a) there is a greater freedom in designing the lens unit, so that the air lens can take over part of the chromatic aberration correction function;

(b) the various aberrations can be quickly corrected, so that, in particular, higher order aberration can be easily controlled; and (c) the negative lens LN11 is separated from the positive lens LP12, so that the principal point of the front lens subunit is pushed out, resulting in size reduction.

The rear lens subunit F12, being a focusing movable lens unit, is composed of at least one negative lens LN21 positioned as the first or second lens from the object and at least two positive lenses. The rear lens subunit F12 is designed with the minimum degree of freedom required so as to correct changes in spherical aberration, astigmatism, distortion, chromatic aberration, etc., whereby high optical properties are obtained to achieve excellent zooming and a small M.O.D.

In accordance with Condition (3), the focal length of the negative lens LN21 of the rear lens subunit is set in order to prevent changes in aberration that occur during focusing.

When the upper limit in Condition (3) is exceeded and the focal length Fc12 of the rear lens subunit (the focusing movable lens subunit) increases, the rear lens subunit moves in and out by a greater amount in order to bring an object into focus. This increases the amount of dead space within the first focusing lens unit F, which makes the first lens unit F larger as a whole, causing the zoom lens device to become larger and heavier. When, on the other hand, the F21/Fc12 ratio drops below the lower limit and the focal length Fc12 of the rear lens subunit becomes smaller, the size of the first focusing unit F as whole is reduced, but the radius of curvature of each lens element composing the rear lens subunit F12 abruptly becomes small, making it difficult to correct changes in aberrations that occur due to zooming or focusing.

By virtue of the above-described construction, the object of the present invention can be achieved. In addition, the materials for the lens elements are chosen so that very good optical properties can be provided. When first order chromatic aberration correction is performed for two wavelengths such as of the C and F lines, the secondary spectrum remains. A lens corrected for color aberration for three wavelengths including, for example, the g line, is called an achromat. The achromat is composed of a positive lens element and a negative lens element, with the two lens elements having very different Abbe constants in order to perform first order chromatic aberration correction and made of materials having the same partial dispersion values.

Here, partial dispersion ratio refers to the ratio of the difference between the partial dispersions of any two wavelengths $\lambda_1$, $\lambda_2$ expressed as $n\lambda_1-n\lambda_2$ with respect to the difference between the primary dispersion of the F and C lines, $n_F-n_c$.

If chromatic aberration is corrected for three lines, the C, F, and g lines, the chromatic aberration curve is continuous, so that the remaining chromatic aberration over the entire visible range of from 400 nm to 700 nm becomes extremely small.

The following considerations are made when choosing the materials for the first lens unit F.

(i) As regards the front lens subunit F11, since it is necessary to correct chromatic aberration for paraxial rays in accordance with the above-described condition, the positive and negative lenses used for first order chromatic aberration correction are made to have very different Abbe constants. For example, a positive lens having an Abbe constant of more than 90 and a negative lens with a very small Abbe constant are used. A typical example of such a positive lens is made of materials with extraordinary high dispersion properties such as fluorite. The difference in the Abbe constants is determined by Condition (1). However, the present situation is that there are almost no materials that have a very small Abbe constant and a ratio Pgd of partial dispersion in terms of the g and d lines with respect to the primary dispersion, which is close to that of fluorite exhibiting extraordinarily high dispersion.

(ii) As regards the rear lens subunit F12 (the focusing movable lens subunit), the first or second lens from the object is a negative lens. The negative lens (LN21) is located where the incident axial ray height h becomes largest at the telephoto end, making it a very suitable location for actually correcting for axial chromatic aberration at the telephoto end.

The ratio Pgd of the partial dispersion to the primary dispersion of the negative lens LN21 of the rear lens subunit is limited in accordance with Condition (4). Here, the achromatization effects of the positive lens and the negative lens are such that the partial-to-primary dispersion ratio of the negative lens matches as much as possible to the relatively high ratio of the positive lens. This makes it possible to achieve maximum achromatization at the telephoto end. The positive lens, which is disposed adjacent to the negative lens, may be separated by a small air gap from the negative lens or joined to the negative lens. The positive lens has an Abbe constant of more than 60.

When the upper limit in Condition (4) is exceeded, the difference between the partial-to-primary dispersion ratios of the positive and negative lenses becomes considerably greater, so that the secondary spectrum can seldom be efficiently reduced at the telephoto end.

(iii) As regards the rear lens subunit, the positive lens following the negative and positive lens combination is similarly made of material having an Abbe constant of over 54 and as high an index of refraction as possible. Such a material is used to make it possible to correct non-axial aberrations such as curvature of field and distortion at the wide angle end, not to mention spherical aberration at the telephoto end, so that the radius of curvature can be reduced, and the principal point can be brought out.

As can be understood from the foregoing description, in the present embodiment, the optical arrangement and limitations of the front first lens unit F are determined. When these conditions are satisfied, it is possible to obtain the so-called floating effect.

In floating, an air gap within the moving lens unit becomes larger or smaller when the focusing distance changes in order to bring an object into focus, whereby the angle and height of the passing light rays change in order to prevent changes in aberration.

In the present embodiment, the front first lens unit F is composed of the front lens subunit F11 which is stationary and a rear lens subunit F12 which moves to bring an object into focus. A suitable arrangement in terms of refractive power and suitable materials for the lens elements are used, and the aberration correcting functions are properly divided among the lenses, so that the various aberrations, in particular spherical aberration and axial chromatic aberration, can be satisfactorily corrected over the entire zooming and focusing ranges.

It is to be noted that if there are a plurality of any of $v_{11}$, $v_{12}$, and $v_{21}$, the average value is used to define any of these terms.

The negative lens LN21 of the rear lens subunit (the focusing movable lens subunit) F12 must not have a very strong refractive power in order for it to meet the aforementioned Condition (3). With the focal length condition defined thus, it is preferable that the form of the negative lens is such as to satisfy Condition (5) from the viewpoint of aberration correction.

In relation to Condition (3), when $$\left| \frac{r_b + r_a}{r_b - r_a} \right|$$

drops below the lower limit in Condition (5), the negative lens in the rear lens subunit has a strong dispersion refractive power, and is a much thicker around the central section compared to the central section. This gives rise to the following disadvantages.

Figure 35:
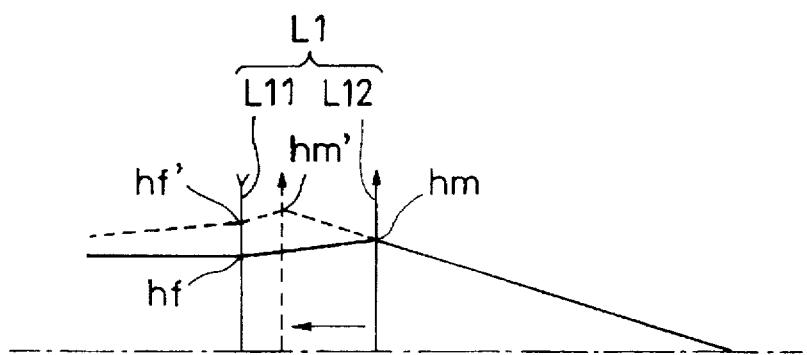
FIG. 35 illustrates the paraxial refractive powers and the arrangement of the first lens subunits of the first lens unit of a conventional zoom lens device composed of four lens units.
Figure 36A:
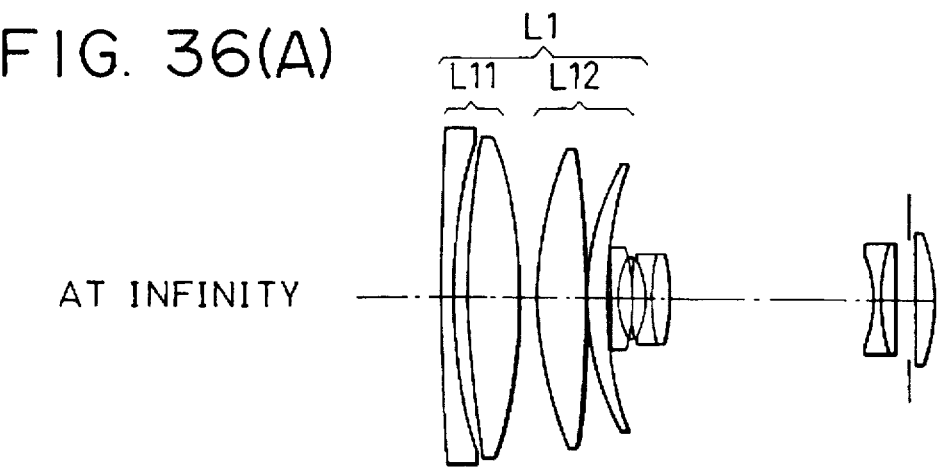
FIGS. 36(A) and 36(B) are cross sectional views of the first lens unit of the conventional zoom lens device composed of four lens units.
Figure 36B:
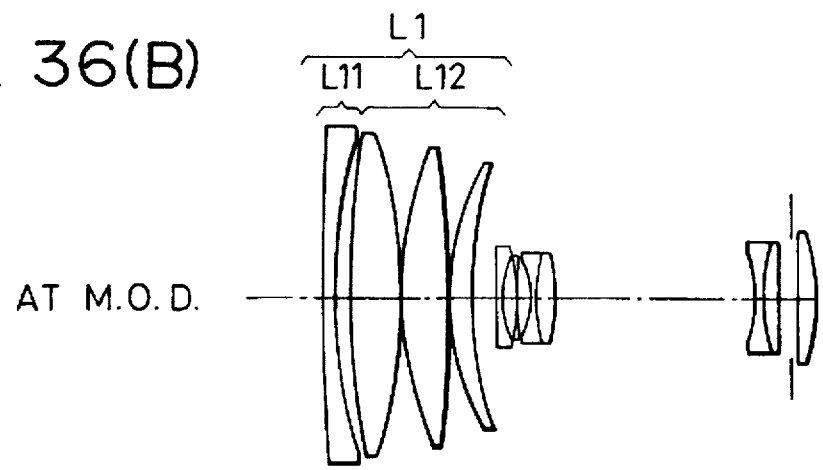

(i) In comparison with the focusing method illustrated in FIGS. 33 to 36(B), when a negative lens with a very strong dispersion refractive power is present in the rear lens subunit (focusing movable lens subunit) and the paraxial optical arrangement is used, the rays leave the focusing stationary front lens subunit at a small angle $\alpha$, making the difference between hm–hf and hb–ha small, even in a zoom lens device utilizing the inner-focusing method illustrated in FIG. 35. For this reason, it is very difficult to keep aberration changes small even when the inner focusing method is utilized.

(ii) When a negative lens with a strong dispersion refractive power is present in the movable focusing lens unit, it is difficult to push out the principal point at the image side of the first lens unit with an overall positive refractive power, resulting in a larger dead space from the time the paraxial optical arrangement is realized, thereby preventing reduction in size.

(iii) When the sections around the center become too thick, the height h of the paraxial rays passing through the whole effective aperture of the focusing movable subunit at the wide angle side becomes very large, thereby increasing the diameter of the front lens subunit and thus preventing size reduction.

On the other hand, when the upper limits in Conditions (3) and (5) are exceeded, the dispersion refractive power of the negative lens in the rear lens subunit becomes very weak, and the central section and the sections around the center are about the same thickness. In such a case, there is almost no achromatization, so that not only is the amount of dead space increased, but it also often becomes increasingly difficult to actually manufacture the lens.

In order for the zoom lens device to have a zoom ratio of from about 13 to 44 and for it to have a wide aperture over the entire zooming range, the first lens unit F is made to satisfy Condition (6), so that a bright lens system is formed. When the Condition (6) is satisfied and FN1 drops below the lower limit, a larger aperture can be used, but it is very difficult to correct the various aberrations. On the other hand, when the upper limit is exceeded, it is difficult to obtain a bright zoom lens device.

From the viewpoints of obtaining good optical properties and reducing the size of the first lens unit while satisfying Condition (6), it is necessary to limit the focal length Fc12 of the rear lens subunit F12. In a zoom lens device such as a broadcasting zoom lens device that must have good optical properties, the focal length of the rear lens subunit is kept within the limits of Condition (7) because good optical properties cannot be obtained by a forced reduction in the size of the first lens unit.

When the upper limit is exceeded, there is a tendency for the optical power of the rear lens subunit to be decreased, the amount of movement of the rear lens subunit during focusing to be increased, and the diameter of the first lens unit F to be increased. On the other hand, when the Fc12/F1 value drops below the lower limit, the optical power of the rear lens subunit is increased, making it difficult to correct spherical aberration and changes in the various aberrations.

Chromatic aberration at the paraxial region can be satisfactorily corrected by the front lens subunit F11 alone. However, when a thicker lens is used, in particular to achieve inner focusing, the entire first lens unit F becomes very thick, generating a large error from the third-order aberration. Accordingly, it is necessary to correct chromatic aberration in order to correct the error from the third-order aberration in accordance with Conditions (8) to (10). EP and EM are both parameters indicating the degree of achromatization. When ET=EM=0, chromatic aberration has been sufficiently reduced at the first lens unit F, whereby the axial chromatic aberration at the telephoto end is reduced. Methods for bringing the EF and the EM close to zero include:

(i) increasing the focal length of each lens element;
(ii) increasing the Abbe constant of the material of each lens element; and
(iii) using a positive lens element and a negative lens element to construct each lens subunit in order to reduce chromatic aberration.

However, when method (i) is used, the overall size of the zoom lens device cannot be reduced. When method (ii) is used, there is a limit as to how much the Abbe constant can be increased because the materials of the lens element actually have an Abbe constant in the range of about 20 to 95. Consequently, method (iii) can be considered as the most effective method. Particularly in the zoom lens device utilizing the inner focusing method, the EF value has been, hitherto, brought close to zero relatively easily by a combination of negative and positive lenses. However, it has been hitherto difficult to bring the EM value close to zero because the rear lens subunit or the focusing movable lens subunit was composed of a plurality of positive lenses only. One reason for using only positive lenses for the movable focusing lens subunit is to reduce the size of the lens subunit as much as possible. Another reason is that residual chromatic aberration, particularly, at the telephoto end can be kept down to a very low level from the practical viewpoint. For high-definition images, however, the spatial frequency of the zoom lens device utilizing the inner focusing method is three times that of the zoom lens device employing the conventional method, thus making it necessary to correct chromatic aberration, in particular, at the telephoto end as much as possible. Accordingly, chromatic aberration at the front lens subunit F11 and the rear lens subunit F12 must be reduced to a small value in accordance with Conditions (8) and (9).

Condition (10) is a parameter that indicates the degree of achromatization at the entire first lens unit F, that is the reduction in chromatic aberration at the front and rear lens subunits. When the EF/EM drops below the lower limit of Condition (10), there is insufficient achromatization at the front lens subunit, and when the upper limit is exceeded there is, in contrast, too much achromatization thereat. In such cases, too much or insufficient achromatization occurs at the variator and the other optical systems that are disposed further away from the object compared to the variator. This results in problems such as larger changes in the chromatic aberration in the zooming region. The same thing also applies to the lenses within the front lens subunit. In Condition (8), when the EF value drops below the lower limit, the chromatic aberration within the front lens subunit is corrected, with the EM value exceeding the upper limit. Consequently, as described with reference to FIG. 35, the axial incident ray height h changes as the focusing object distance changes from infinity to M.O.D. and vice versa and chromatic aberration is not sufficiently corrected at the focusing movable subunit, so that a large change in the axial chromatic aberration due to focusing occurs.

In contrast, when the EF value of Condition (8) becomes positive, achromatization at the focusing movable lens subunit F12 must be negative. In order for the EM value to satisfy the condition of Condition (7) and the EM value to be negative, a negative lens with a very high dispersion refractive power must be provided in the focusing movable lens subunit.

A description will now be given of the numerical examples of the present invention. In the numerical examples, Ri represents the radius of curvature of the ith lens from the object; Di represents the thickness of the ith lens from the object and the air gap; and Ni and vi represent, respectively, the glass refractive power and Abbe constant of the ith lens from the object. The last two or three lens are glass blocks such as face plates, filters, etc.

Table 1 shows the relationship between the above-described conditions and the numerical values of the numerical examples.

A non-spherical shape is expressed by the following:

$$X = \frac{(1/R)H^2}{1 + \sqrt{1 - (1+k)(H/R)^2}} + A_2 H^4 + A_3 H^6 + A_4 H^8 + A_5 H^{10}$$

where the x-axis extends along the direction of the optical axis, the H-axis extends along a direction perpendicular to the optical axis, the direction in which light travels is defined positive, R denotes the paraxial radius of curvature, and K, $A_2$, $A_3$, $A_4$, and $A_5$ each represent nonspherical coefficients.

A description will now be given of the numerical examples of the present invention.

[Numerical Example 1]

f = 9.00  fno = 1:1.7~2.0  2ω = 62.9°~5.4°

| | | | | | | | | | |
|---|---|---|---|---|---|---|---|---|---|
| r1 = | −899.355 | d1 = | 2.50 | n1 = | 1.76168 | v1 = | 27.5 | Pgd = | 1.31585 |
| r2 = | 110.946 | d2 = | 4.24 | | | | | | |
| r3 = | 179.567 | d3 = | 10.43 | n2 = | 1.43985 | v2 = | 95.0 | Pgd = | 1.22944 |
| r4 = | −162.561 | d4 = | 6.98 | | | | | | |
| r5 = | 102.046 | d5 = | 2.00 | n3 = | 1.61673 | v3 = | 43.8 | Pgd = | 1.26305 |
| r6 = | 60.702 | d6 = | 0.02 | | | | | | |
| r7 = | 60.679 | d7 = | 16.09 | n4 = | 1.62032 | v4 = | 63.4 | Pgd = | 1.24000 |
| r8 = | −228.657 | d8 = | 0.15 | | | | | | |
| r9 = | 54.929 | d9 = | 5.77 | n5 = | 1.73234 | v5 = | 54.7 | Pgd = | 1.23988 |
| r10 = | 105.402 | d10 = | variable | | | | | | |
| r11 = | 53.206 | d11 = | 0.80 | n6 = | 1.88815 | v6 = | 40.8 | | |
| r12 = | 21.213 | d12 = | 4.57 | | | | | | |
| r13 = | −41.416 | d13 = | 0.80 | n7 = | 1.82017 | v7 = | 46.6 | | |
| r14 = | 24.709 | d14 = | 3.23 | | | | | | |
| r15 = | 28.065 | d15 = | 0.80 | n8 = | 1.83945 | v8 = | 42.7 | | |

-continued

| | | | |
|---|---|---|---|
| r16 = 20.728 | d16 = 5.00 | n9 = 1.76260 | v9 = 25.1 |
| r17 = −45.999 | d17 = 0.80 | n10 = 1.88814 | v10 = 40.8 |
| r18 = 103.594 | d18 = variable | | |
| r19 = −29.943 | d19 = 0.90 | n11 = 1.76077 | v11 = 47.8 |
| r20 = 40.810 | d20 = 2.36 | n12 = 1.85501 | v12 = 23.9 |
| r21 = 1201.272 | d21 = variable | | |
| r22 = (stop) | d22 = 1.10 | | |
| r23 = 159.295 | d23 = 3.33 | n13 = 1.70558 | v13 = 41.2 |
| r24 = −60.368 | d24 = 0.20 | | |
| r25 = 119.213 | d25 = 2.27 | n14 = 1.50349 | v14 = 56.4 |
| r26 = −1478.014 | d26 = 0.20 | | |
| r27 = 74.499 | d27 = 6.29 | n15 = 1.50349 | v15 = 56.4 |
| r28 = −26.004 | d28 = 1.30 | n16 = 1.80811 | v16 = 46.6 |
| r29 = −114.378 | d29 = 28.00 | | |
| r30 = 72.105 | d30 = 6.11 | n17 = 1.48915 | v17 = 70.2 |
| r31 = −40.249 | d31 = 0.20 | | |
| r32 = −92.459 | d32 = 1.40 | n18 = 1.83932 | v18 = 37.2 |
| r33 = 46.430 | d33 = 6.75 | n19 = 1.50014 | v19 = 65.0 |
| r34 = −49.362 | d34 = 0.20 | | |
| r35 = 86.161 | d35 = 6.49 | n20 = 1.48915 | v20 = 70.2 |
| r36 = −26.372 | d36 = 1.40 | n21 = 1.83945 | v21 = 42.7 |
| r37 = −177.791 | d37 = 0.20 | | |
| r38 = 38.470 | d38 = 4.22 | n22 = 1.60548 | v22 = 60.7 |
| r39 = 1675.041 | d39 = 4.10 | | |
| r40 = ∞ | d40 = 30.00 | n23 = 1.60718 | v23 = 38.0 |
| r41 = ∞ | d41 = 16.20 | n24 = 1.51825 | v24 = 64.2 |
| r42 = ∞ | | | |

| focal length variable interval | 9.00 | 18.00 | 36.00 | 72.00 | 117.00 |
|---|---|---|---|---|---|
| d10 | 0.88 | 20.42 | 33.62 | 42.45 | 46.47 |
| d18 | 47.01 | 24.56 | 9.78 | 3.30 | 4.71 |
| d21 | 5.40 | 8.31 | 9.88 | 7.54 | 2.10 |

|Numerical Example 2| f = 8.50   fno = 1:1.7–2.1   2ω = 65.8°–4.9°

| | | | | |
|---|---|---|---|---|
| r1 = −255.551 | d1 = 2.50 | n1 = 1.74553 | v1 = 31.7 | Pgd = 1.29828 |
| r2 = 116.017 | d2 = 3.32 | | | |
| r3 = 159.478 | d3 = 10.66 | n2 = 1.43985 | v2 = 95.0 | Pgd = 1.22944 |
| r4 = −169.489 | d4 = 5.96 | | | |
| r5 = 131.149 | d5 = 2.20 | n3 = 1.61669 | v3 = 44.2 | Pgd = 1.26190 |
| r6 = 75.618 | d6 = 0.02 | | | |
| r7 = 75.377 | d7 = 12.37 | n4 = 1.43985 | v4 = 95.0 | Pgd = 1.22944 |
| r8 = −525.485 | d8 = 0.15 | | | |
| r9 = 93.787 | d9 = 10.38 | n5 = 1.60520 | v5 = 65.5 | Pgd = 1.23561 |
| r10 = −299.830 | d10 = 0.15 | | | |
| r11 = 54.733 | d11 = 5.40 | n6 = 1.73234 | v6 = 54.7 | Pgd = 1.23988 |
| r12 = 92.732 | d12 = variable | | | |
| r13 = 48.885 | d13 = 0.980 | n7 = 1.88814 | v7 = 40.8 | |
| r14 = 17.522 | d14 = 4.68 | | | |
| r15 = −53.332 | d15 = 0.80 | n8 = 1.82017 | v8 = 46.6 | |
| r16 = 25.118 | d16 = 4.28 | | | |
| r17 = 28.654 | d17 = 4.15 | n9 = 1.82600 | v9 = 23.7 | |
| r18 = −53.487 | d18 = 0.59 | | | |
| r19 = −34.766 | d19 = 0.80 | n10 = 1.77621 | v10 = 49.6 | |
| r20 = 88.499 | d20 = variable | | | |
| r21 = −27.616 | d21 = 0.90 | n11 = 1.77621 | v11 = 49.6 | |
| r22 = 43.086 | d22 = 2.42 | n12 = 1.85501 | v12 = 23.9 | |
| r23 = −481.564 | d23 = variable | | | |
| r24 = (stop) | d24 = 1.10 | | | |
| r25 = 231.826 | d25 = 3.56 | n13 = 1.51977 | v13 = 52.4 | |
| r26 = −46.618 | d26 = 0.20 | | | |
| r27 = 168.010 | d27 = 3.04 | n14 = 1.51977 | v14 = 52.4 | |
| r28 = −81.919 | d28 = 0.20 | | | |
| r29 = 69.136 | d29 = 6.07 | n15 = 1.51977 | v15 = 52.4 | |
| r30 = −30.903 | d30 = 1.30 | n16 = 1.82017 | v16 = 46.6 | |
| r31 = −320.915 | d31 = 32.00 | | | |
| r32 = 49.972 | d32 = 6.30 | n17 = 1.48915 | v17 = 70.2 | |
| r33 = −48.901 | d33 = 0.20 | | | |
| r34 = −289.282 | d34 = 1.40 | n18 = 1.83932 | v18 = 37.2 | |
| r35 = 28.438 | d35 = 6.00 | n19 = 1.50349 | v19 = 56.4 | |
| r36 = 782.437 | d36 = 0.20 | | | |
| r37 = 68.152 | d37 = 6.91 | n20 = 1.48915 | v20 = 70.2 | |
| r38 = −25.893 | d38 = 1.40 | n21 = 1.83932 | v21 = 37.2 | |
| r39 = −65.266 | d39 = 0.20 | | | |
| r40 = 40.256 | d40 = 4.43 | n22 = 1.51314 | v22 = 60.5 | |
| r41 = −609.030 | d41 = 4.00 | | | |

-continued

| | | | |
|---|---|---|---|
| r42 = ∞ | d42 = 30.00 | n23 = 1.60718 | v23 = 38.0 |
| r43 = ∞ | d43 = 16.20 | n24 = 1.51825 | v24 = 64.2 |
| r44 = ∞ | | | |

| focal length variable interval | 8.50 | 17.00 | 34.00 | 68.00 | 127.50 |
|---|---|---|---|---|---|
| d12 | 0.80 | 19.24 | 31.64 | 39.85 | 44.35 |
| d20 | 44.49 | 23.25 | 9.39 | 3.47 | 6.23 |
| d23 | 6.20 | 8.99 | 10.45 | 8.17 | 0.90 |

[Numerical Example 3]

f = 8.00   fno = 1:1.7~2.7   2ω = 69.0°~3.9°

| | | | | | |
|---|---|---|---|---|---|
| r1 = −200.224 | d1 = 2.70 | n1 = 1.85649 | v1 = 32.3 | Pgd = 1.29992 |
| r2 = 186.083 | d2 = 6.51 | | | |
| r3 = 455.997 | d3 = 12.01 | n2 = 1.43985 | v2 = 95.0 | Pgd = 1.22944 |
| r4 = −127.284 | d4 = 7.88 | | | |
| r5 = 142.838 | d5 = 2.50 | n3 = 1.79013 | v3 = 44.2 | Pgd = 1.26490 |
| r6 = 99.498 | d6 = 0.02 | | | |
| r7 = 98.215 | d7 = 15.15 | n4 = 1.43985 | v4 = 95.0 | Pgd = 1.22944 |
| r8 = −234.945 | d8 = 0.20 | | | |
| r9 = 114.271 | d9 = 10.09 | n5 = 1.60520 | v5 = 65.5 | Pgd = 1.23561 |
| r10 = −511.370 | d10 = 0.15 | | | |
| r11 = 59.804 | d11 = 6.26 | n6 = 1.60520 | v6 = 65.5 | Pgd = 1.23561 |
| r12 = 114.982 | d12 = variable | | | |
| r13 = 47.010 | d13 = 0.90 | n7 = 1.88814 | v7 = 40.8 | |
| r14 = 16.663 | d14 = 6.70 | | | |
| r15 = −56.863 | d15 = 0.80 | n8 = 1.82017 | v8 = 46.6 | |
| r16 = 33.831 | d16 = 4.47 | | | |
| r17 = 29.158 | d17 = 5.32 | n9 = 1.82600 | v9 = 23.7 | |
| r18 = −52.029 | d18 = 0.90 | | | |
| r19 = −31.823 | d19 = 0.80 | n10 = 1.75844 | v10 = 52.3 | |
| r20 = 72.877 | d20 = variable | | | |
| r21 = −29.012 | d21 = 0.75 | n11 = 1.77621 | v11 = 49.6 | |
| r22 = 70.928 | d22 = 1.24 | n12 = 1.93301 | v12 = 21.3 | |
| r23 = −370.095 | d23 = variable | | | |
| r24 = (stop) | d24 = 1.30 | | | |
| r25 = 263.190 | d25 = 4.11 | n13 = 1.62287 | v13 = 60.3 | |
| r26 = −54.541 | d26 = 0.18 | | | |
| r27 = 156.992 | d27 = 3.30 | n14 = 1.50014 | v14 = 65.0 | |
| r28 = −126.947 | d28 = 0.15 | | | |
| r29 = 47.125 | d29 = 7.68 | n15 = 1.50349 | v15 = 56.4 | |
| r30 = −40.483 | d30 = 1.50 | n16 = 1.83945 | v16 = 42.7 | |
| r31 = −252.408 | d31 = 28.00 | | | |
| r32 = 78.868 | d32 = 5.51 | n17 = 1.48915 | v17 = 70.2 | |
| r33 = −41.808 | d33 = 0.30 | | | |
| r34 = −67.885 | d34 = 1.40 | n18 = 1.88814 | v18 = 40.8 | |
| r35 = 23.625 | d35 = 7.81 | n19 = 1.51825 | v19 = 64.2 | |
| r36 = ˜67.344 | d36 = 0.20 | | | |
| r37 = 51.956 | d37 = 5.93 | n20 = 1.51314 | v20 = 60.5 | |
| r38 = −33.404 | d38 = 1.30 | n21 = 1.83945 | v21 = 42.7 | |
| r39 = −888.472 | d39 = 0.15 | | | |
| r40 = 35.701 | d40 = 5.19 | n22 = 1.51825 | v22 = 64.2 | |
| r41 = −78.383 | d41 = 4.50 | | | |
| r42 = ∞ | d42 = 30.00 | n23 = 1.60718 | v23 = 38.0 | |
| r43 = ∞ | d43 = 16.20 | n24 = 1.51825 | v24 = 64.2 | |
| r44 = ∞ | | | | |

| focal length variable interval | 8.00 | 16.00 | 48.00 | 96.00 | 160.00 |
|---|---|---|---|---|---|
| d12 | 0.52 | 22.64 | 43.59 | 51.03 | 54.34 |
| d20 | 58.26 | 32.92 | 9.50 | 5.75 | 9.23 |
| d23 | 6.00 | 9.22 | 11.70 | 8.01 | 1.21 |

[Numerical Example 4-1]

f = 10.00000   fno = 1:1.8~4.0   2ω = 57.6°~1.4°

| | | | | |
|---|---|---|---|---|
| r1 = 258.310 | d1 = 5.50 | n1 = 1.83932 | v1 = 37.2 | Pgd = 1.28253 |
| r2 = 147.470 | d2 = 0.04 | | | |
| r3 = 145.655 | d3 = 19.52 | n2 = 1.43496 | v2 = 95.1 | Pgd = 1.23247 |
| r4 = 1788.734 | d4 = 11.37 | | | |
| r5 = 502.121 | d5 = 11.81 | n3 = 1.43496 | v3 = 95.1 | Pgd = 1.23247 |
| r6 = −540.542 | d6 = 0.15 | | | |
| r7 = −525.580 | d7 = 5.00 | n4 = 1.77621 | v4 = 49.6 | Pgd = 1.24984 |
| r8 = −4050.532 | d8 = 0.30 | | | |
| r9 = 188.279 | d9 = 18.58 | n5 = 1.43496 | v5 = 95.1 | Pgd = 1.23247 |

-continued

| | | | | |
|---|---|---|---|---|
| r10 = −779.770 | d10 = 0.30 | | | |
| r11 = 144.762 | d11 = 11.15 | n6 = 1.49845 | v6 = 81.6 | Pgd = 1.23153 |
| r12 = 333.208 | d12 = variable | | | |
| r13 = 337.087 | d13 = 2.00 | n7 = 1.82017 | v7 = 46.6 | |
| r14 = 54.313 | d14 = 4.71 | | | |
| r15 = −170.414 | d15 = 1.80 | n8 = 1.77621 | v8 = 49.6 | |
| r16 = 50.612 | d16 = 6.91 | | | |
| r17 = −66.371 | d17 = 1.80 | n9 = 1.82017 | v9 = 46.6 | |
| r18 = 45.577 | d18 = 7.83 | n10 = 1.93306 | v10 = 21.3 | |
| r19 = −346.002 | d19 = variable | | | |
| r20 = 9753.850 | d20 = 6.52 | n11 = 1.49845 | v11 = 81.6 | |
| r21 = −113.140 | d21 = 0.30 | | | |
| r22 = 190.740 | d22 = 2.50 | n12 = 1.65223 | v12 = 33.8 | |
| r23 = 54.467 | d23 = 13.62 | n13 = 1.59143 | v13 = 61.2 | |
| r24 = −152.092 | d24 = 0.20 | | | |
| r25 = 118.516 | d25 = 13.11 | n14 = 1.62032 | v14 = 63.4 | |
| r26 = −76.404 | d26 = 2.50 | n15 = 1.85501 | v15 = 23.9 | |
| r27 = −155.554 | d27 = 0.20 | | | |
| r28 = 89.671 (non-spherical) | d28 = 3.78 | n16 = 1.48915 | v16 = 70.2 | |
| r29 = 168.002 | d29 = variable | | | |
| r30 = (stop) | d30 = 3.29 | | | |
| r31 = −52.660 | d31 = 1.80 | n17 = 1.79013 | v17 = 44.2 | |
| r32 = 33.435 | d32 = 4.19 | n18 = 1.81265 | v18 = 25.4 | |
| r33 = 142.254 | d33 = 6.15 | | | |
| r34 = −44.772 | d34 = 1.60 | n19 = 1.73234 | v19 = 54.7 | |
| r35 = 30.867 | d35 = 10.72 | n20 = 1.59911 | v20 = 39.2 | |
| r36 = −30.393 | d36 = 24.00 | | | |
| r37 = 400.206 | d37 = 5.96 | n21 = 1.48915 | v21 = 70.2 | |
| r38 = −31.694 | d38 = 0.20 | | | |
| r39 = −43.632 | d39 = 2.20 | n22 = 1.79013 | v22 = 44.2 | |
| r40 = 41.339 | d40 = 6.15 | n23 = 1.50349 | v23 = 56.4 | |
| r41 = −49.159 | d41 = 1.10 | | | |
| r42 = 1051.682 | d42 = 6.15 | n24 = 1.55099 | v24 = 45.8 | |
| r43 = −29.627 | d43 = 2.20 | n25 = 1.81265 | v25 = 25.4 | |
| r44 = −83.226 | d44 = 0.20 | | | |
| r45 = 73.620 | d45 = 4.26 | n26 = 1.51977 | v26 = 52.4 | |
| r46 = −74.825 | d46 = 5.00 | | | |
| r47 = ∞ | d47 = 50.00 | n27 = 1.51825 | v27 = 64.2 | |
| r48 = ∞ | | | | |

| non-spherical shape | reference spherical shape | R = 89.671 |
|---|---|---|
| non-spherical coefficients | A = B = C = E = 0 | D = 5.99704 × 10$^{-14}$ |

[Numerical Example 4-2]

| focal length variable interval | 10.00 | 19.49 | 69.79 | 257.37 | 441.10 |
|---|---|---|---|---|---|
| d12 | 1.72 | 43.72 | 91.72 | 115.22 | 120.72 |
| d19 | 176.93 | 129.87 | 67.75 | 20.44 | 0.87 |
| d29 | 3.30 | 8.36 | 22.48 | 46.29 | 60.36 |

TABLE 1

| | Numerical Examples | | | |
|---|---|---|---|---|
| | 1 | 2 | 3 | 4 |
| $v_{11N} - v_{12P}$ | −67.46 | −63.31 | −62.68 | −57.93 |
| $v_{11N} - v21N$ | −16.33 | −12.58 | −11.90 | −12.43 |
| $f_{21}/Fc12$ | −3.728 | −4.967 | −6.366 | −4.009 |
| $(n_g-n_d)/(n_f-n_c)$ | 1.263 | 1.262 | 1.265 | 1.2498 |
| $\left|\dfrac{r_b + r_a}{r_b - r_a}\right|$ | 3.936 | 3.723 | 5.591 | 1.298 |
| FN1 | 1.197 | 1.054 | 1.198 | 1.696 |
| Fc12/F1 | 0.948 | 0.925 | 0.942 | 1.038 |
| EF | −2.269 × 10$^{-4}$ | −2.402 × 10$^{-4}$ | −2.297 × 10$^{-4}$ | −3.527 × 10$^{-5}$ |
| EM | 2.300 × 10$^{-4}$ | 2.273 × 10$^{-4}$ | 1.885 × 10$^{-4}$ | 4.582 × 10$^{-5}$ |
| EF/EM | −0.987 | −1.056 | −1.218 | −0.770 |

The zoom lens device of first numerical example illustrated in FIG. 1 has a zoom ratio greater than 13 and its first (or focusing) lens unit F is composed of R1 to R10, of which R1 to R4 are stationary during zooming or focusing and together make up the focusing stationary front lens subunit F11 that has an overall negative refractive power. R5 to R10 compose the rear lens subunit F12 which has an overall positive refractive power. R1 to R10 of the first lens unit F function to form the object point with respect to the variator V and has an overall positive refractive power.

R11 to R18, making up the variator V, primarily contribute to zooming and monotonically moves toward the image surface and its imaging magnification becomes -1X when zooming from the wide angle end to the telephoto end. R19 to R20, making up the compensator C, function primarily to correct the image point as the magnification changes and change magnification. The compensator C has a positive refractive power and monotonically moves from the wide angle end standard position toward the object during zooming from the wide angle end to the telephoto end.

R23 to R39 make up the relay unit R that functions to form an image, and R40 to R42 make up the glass block which is an equivalent of a color-separating prism.

As an index for a larger aperture, FN1=1.197 in the present example when the f-number of the front first lens unit is expressed as FN1=F1/(FT/FNT), where F1 is the focal length of the first lens unit F, and the focal length and the f-number of the entire system at the telephoto end are FT and FNT, respectively.

In order to achieve a large aperture and form the lenses such that they have the proper refractive powers, one negative lens and one positive lens are disposed in the focusing stationary front lens subunit and two positive lenses are used in the focusing movable rear lens subunit so that spherical aberration and axial chromatic aberration can be corrected in the first lens unit.

In general, it is preferable that the first lens unit F be constructed as simply as possible and that the block be thin in order to reduce the size of the entire lens system and to save power consumed by the driving system. Therefore, it is desirable to use as few lenses as possible for the first lens unit F.

In contrast to this, as described above, the first lens unit F has a small f-number FN1 so that it is very bright and each lens in the front lens subunit must take more part in correcting the various aberrations, making it very difficult to correct aberrations such as spherical aberration and axial chromatic aberration that occur as a result of zooming or focusing.

In the present numerical example, spherical aberration and axial chromatic aberration are prevented from occurring by the use of a negative lens made of the same material as the front lens subunit with a very high refractive power and a positive lens made of the same material as the front lens subunit with a very high Abbe constant. Here, the difference between the Abbe constants of the negative and positive lenses is $v_{11}-v_{12}=-67.46$.

Here, the refractive power of the negative lens (LN21) in the rear lens subunit F12 is:

$$F21/Fc12 = -3.728$$

The partial dispersion ratio and the shape factor of the material of the negative lens are respectively:

$$(ng - nd)/(nF - nC) = 1.263 \text{ and}$$

$$\left|\frac{r_b + r_c}{r_b - r_c}\right| = 3.936$$

The difference between the Abbe constants of the materials of negative lenses which serve as an index for how much the lens elements of the front lens subunit and the rear lens subunit should take part in correcting chromatic aberration is:

$$v_{11}-v_{21}=-16.33$$

Figure 2:
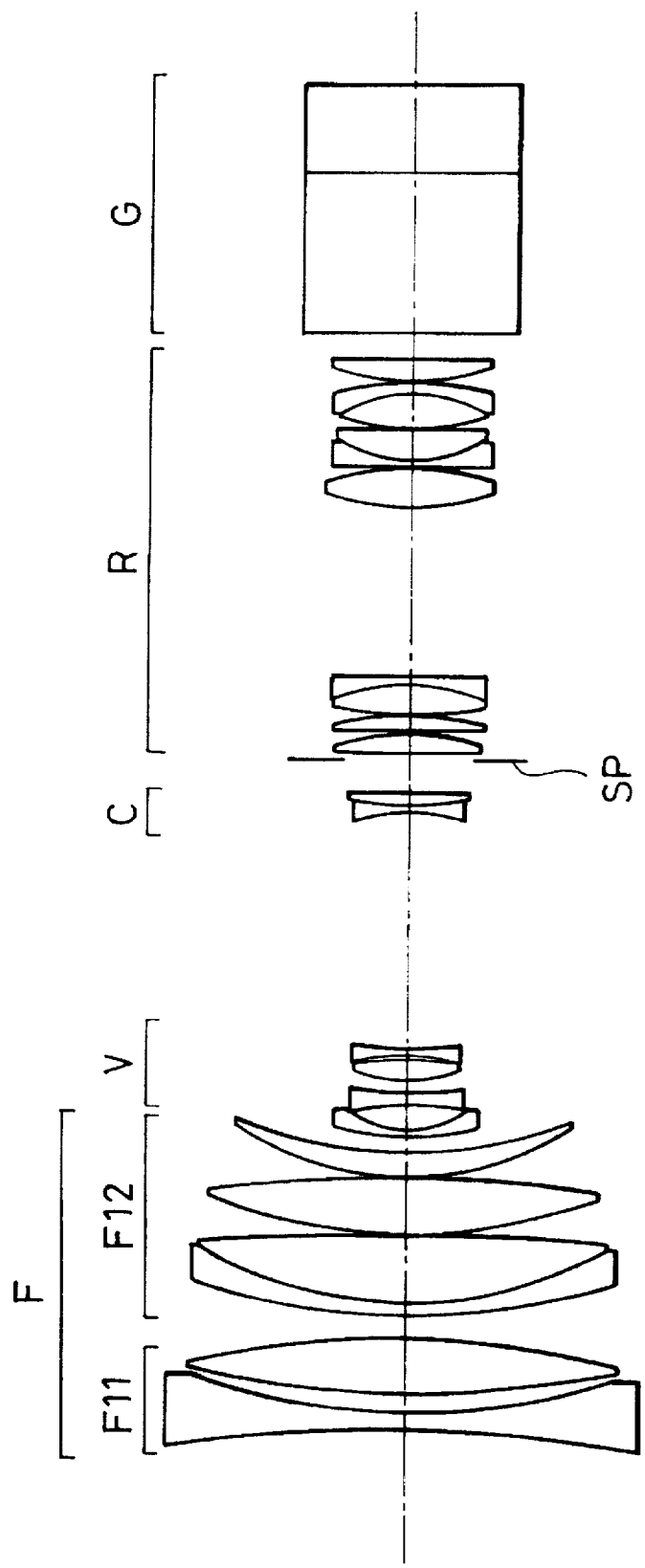
FIG. 2 is a cross sectional view of a lens with a wide angle of a second numerical example in accordance with the present invention.

The zoom lens device of the second numerical example illustrated in FIG. 2 has a zoom ratio greater than 15 and its first lens unit (or focusing lens unit) F is composed of R1 to R12, of which R1 to R4 are stationary during zooming or focusing and together make up the focusing stationary front lens subunit F11 that overall has a positive refractive power. R5 to R10 form the rear lens subunit (focusing movable lens subunit) F12 that overall has a positive refractive power. R1 to R12 of the first lens unit F function to form the object point with respect to the variator V and has an overall positive refractive power.

R13 to R20, forming the variator V, primarily contribute to zooming and, when zooming from the wide angle end to the telephoto end, monotonically moves toward the image surface, during which its imaging magnification becomes -1X. R21 to R23, forming the compensator C, function primarily to correct the image point as zooming is performed, and has a negative refractive power. During zooming from the wide angle end to the telephoto end, the compensator C moves from the wide angle end standard position toward the object, and moves from a certain focal length toward the image, so that at the telephoto end it exists closer to the image than it does when at the wide angle end standard position. Reference characters SP (R24) denotes a stop.

R25 to R41, forming the relay unit R, function to form an image, and R42 to R44 form a glass block which is an equivalent of a color-separating prism.

Compared to the zoom lens device of the first numerical example, the zoom lens device of the present example has a very high zoom ratio of 15, whereas the field angle at the wide angle end is $2\omega=65.8°$.

In order to achieve a wide angle, it is necessary to properly correct the various aberrations such as distortion and chromatic aberration of magnification which greatly affect the field angle. Since the f-number of the front first lens unit is FN1=1.054, the lens unit is very bright.

Therefore, in the present example, one negative lens and three positive lenses are used in the rear lens subunit or the focusing movable lens subunit. The difference between the Abbe constants of the negative lenses of the front lens subunit and the rear lens subunit is $v_{11}-v_{21}$ is -12.58, so that chromatic aberration can be properly corrected even when a wide angle is used. The optical arrangement of the rear lens subunit is such that of the three positive lenses, the one closest the image surface has a relatively high refractive index, whereby chromatic aberration, in addition to spherical aberration and distortion, can be properly corrected.

Figure 3:
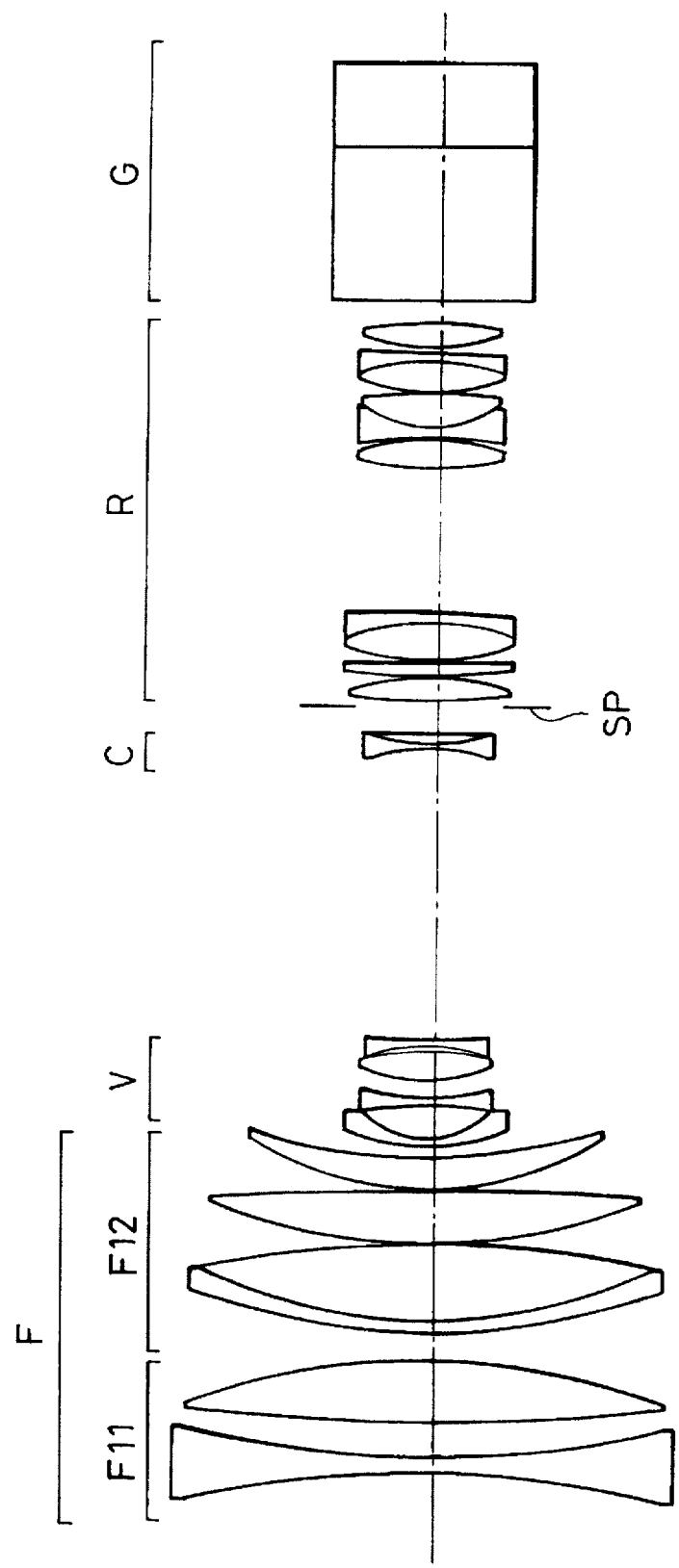
FIG. 3 is a cross sectional view of a lens with a wide angle of a third numerical example in accordance with the present invention.

The zoom lens device of the third numerical example illustrated in FIG. 3 is essentially constructed in the same way as the zoom lens device of the second numerical example, but differs from it in that the lenses are properly arranged in terms of their refractive power in order to achieve a wide angle and excellent zooming. The zoom ratio is 20.

In order to achieve size reduction of the zoom lens device at the same time, each lens subunit takes more part in correcting aberrations and the amount of movement is reduced during zooming by the variator V and the compensator C.

For this reason, the f-number of the first lens unit F is 1.198. In addition, in order to further widen the angle, the retro ratio of the first lens unit must be increased. Further, since the focal length at the telephoto end becomes 160 mm, it becomes difficult to correct, in particular, chromatic aberration at the telephoto end.

Thus, in the present example, the front lens subunit and the rear lens subunit are formed so as to have a relatively high refractive power, and the negative and positive lenses are formed so as to have very small and very high Abbe constants respectively, so that $v_{11}-v_{21}=-62.68$ and $v_{11}-v_{21}=-11.90$. The rear lens subunit, in addition to the front lens subunit, is made to reduce chromatic aberration, so as to prevent changes in the aberrations over the entire zooming and focusing regions.

In the second and third examples, the rear lens subunit is formed by three positive lenses in order to prevent changes in aberrations, in particular, during focusing. Since there is more freedom in designing the focusing movable lens unit:

(i) changes in astigmatism and other aberrations in addition to spherical aberration can readily be corrected, so that the optical properties, in particular the resolving power, can be enhanced; and (ii) a greater variety of materials can be used for the lens elements, allowing the use of, in particular, a positive lens with a very large Abbe constant in order to enhance the achromatization of the focusing movable rear lens subunit, whereby changes in chromatic aberration and color blurring of an image are reduced.

Figure 4:
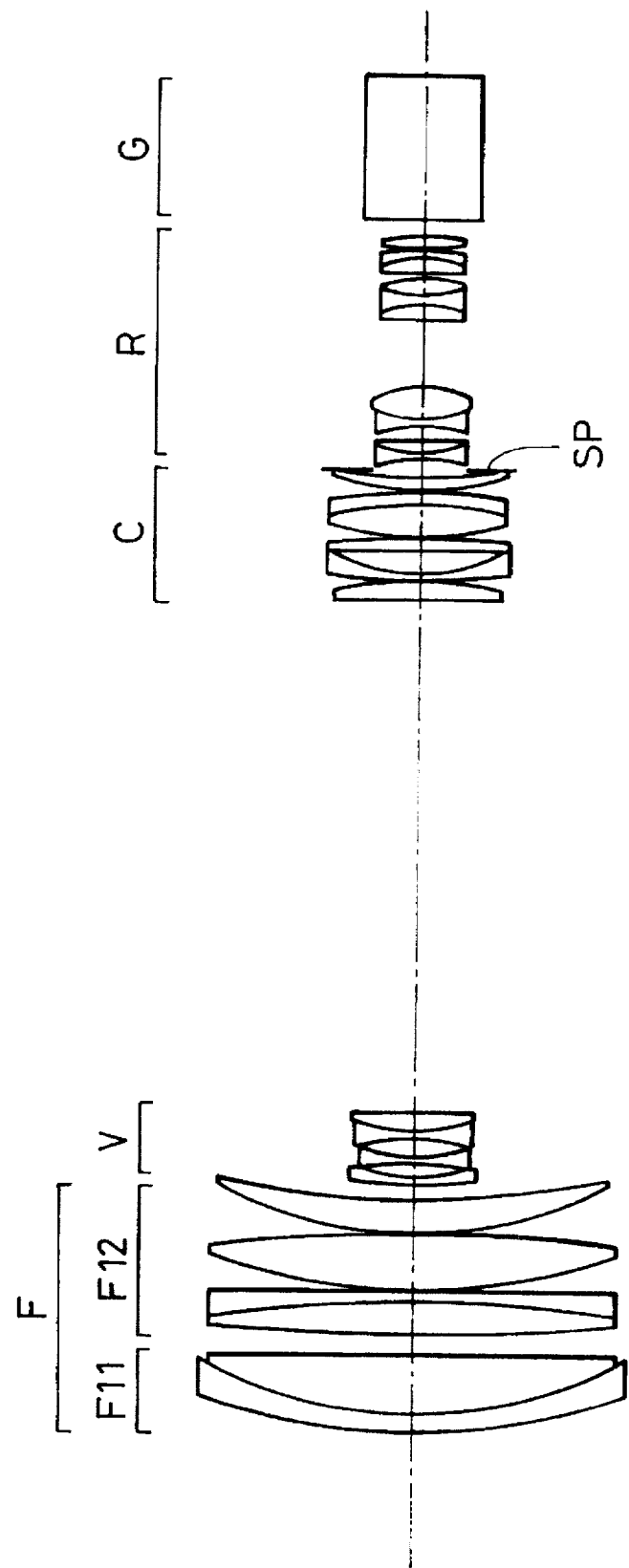
FIG. 4 is a cross sectional view of a lens with a wide angle of a fourth numerical example in accordance with the present invention.
Figure 5A:
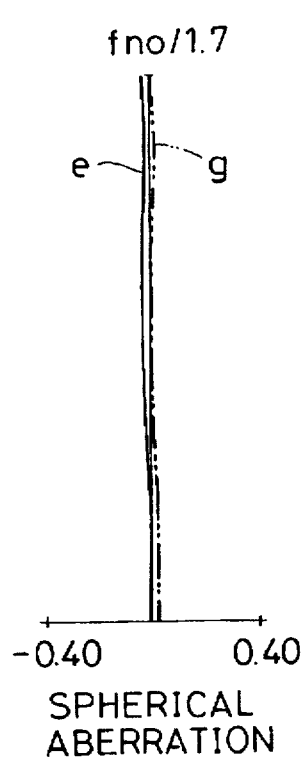
FIGS. 5A, 5B, and 5C illustrate graphs showing different aberrations in the first numerical example of the present invention, when the focal length f=9.0 and the object distance=3.0 m.
Figure 5B:
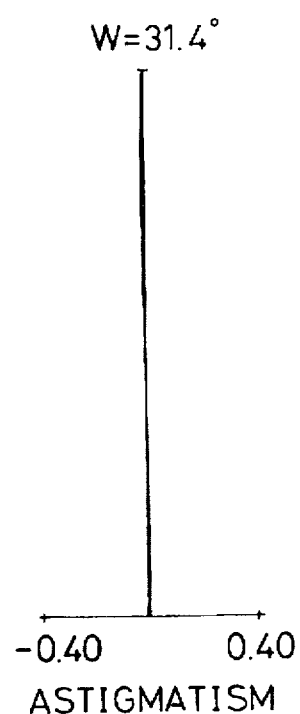
Figure 5C:
Figure 6A:
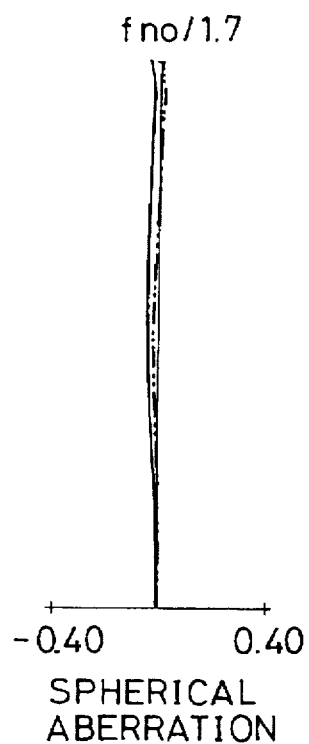
FIGS. 6A, 6B, and 6C illustrate graphs showing different aberrations in the first numerical example of the present invention, when the focal length f=18.0 and the object distance=3.0 m.
Figure 6B:
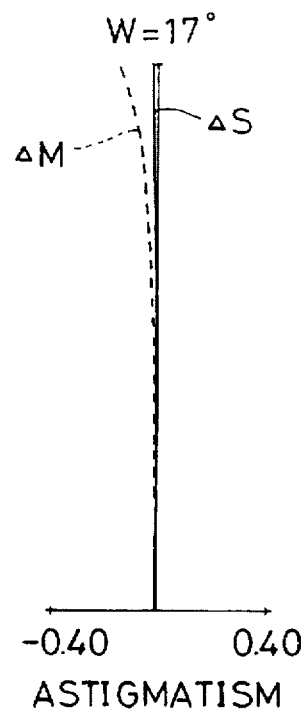
Figure 6C:
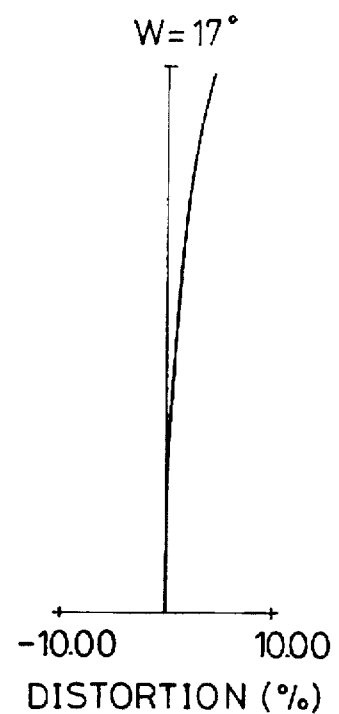
Figure 7A:
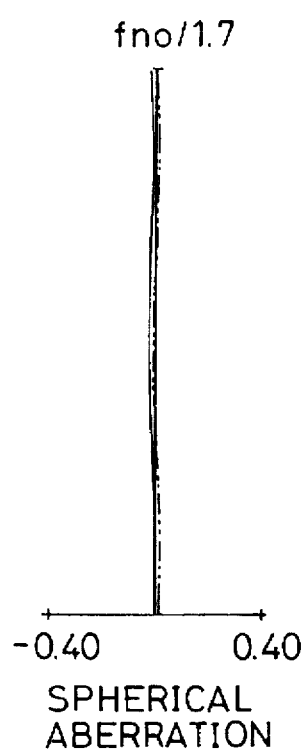
FIGS. 7A, 7B, and 7C illustrate graphs showing different aberrations in the first numerical example of the present invention, when the focal length f=36.0 and the object distance=3.0 m.
Figure 7B:
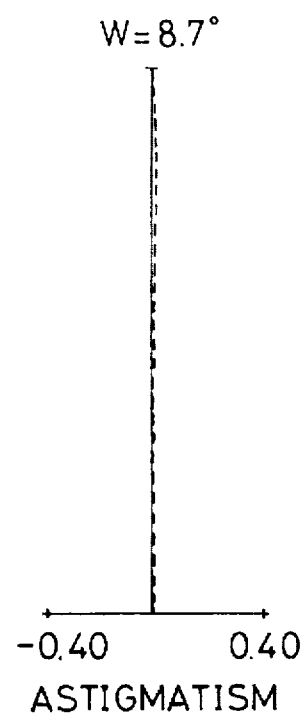
Figure 7C:
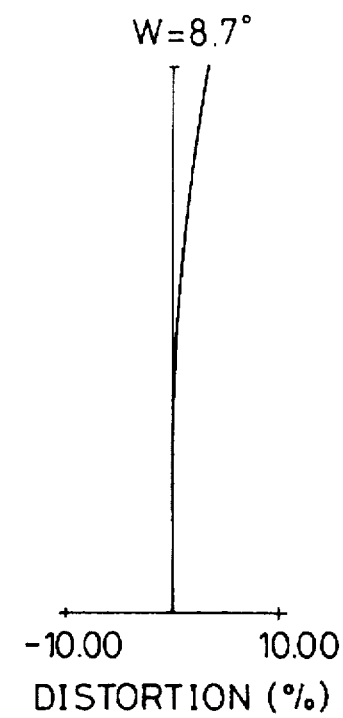
Figure 8A:
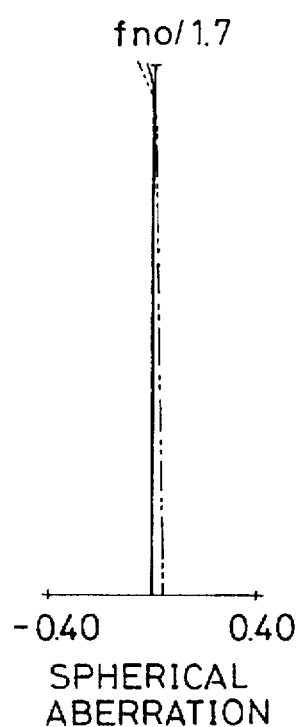
FIGS. 8A, 8B, and 8C illustrate graphs showing different aberrations in the first numerical first example of the present invention, when the focal length f=72.0 and the object distance=3.0 m.
Figure 8B:
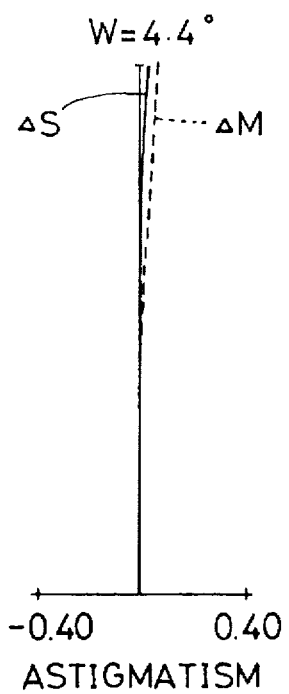
Figure 8C:
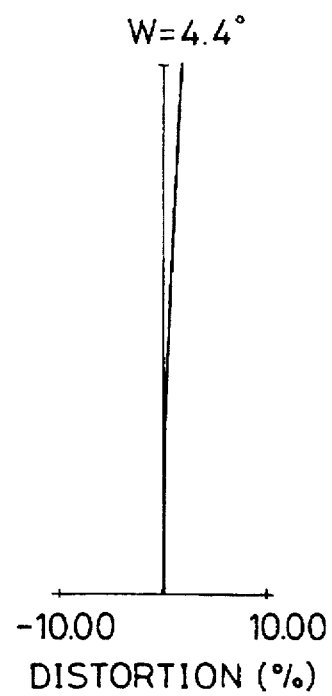
Figure 9A:
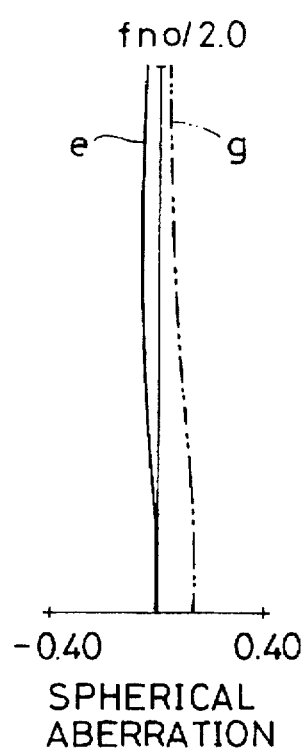
FIGS. 9A, 9B, and 9C illustrate graphs showing different aberrations in the first numerical example of the present invention, when the focal length f=117.0 and the object distance=3.0 m.
Figure 9B:
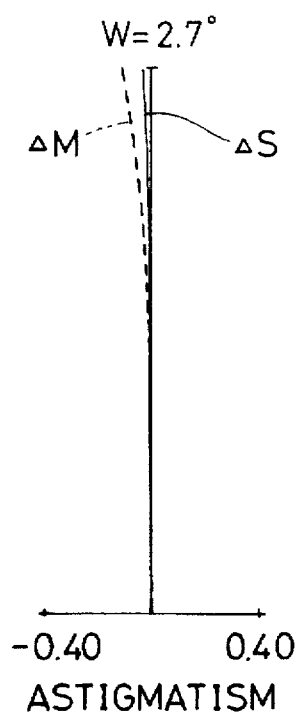
Figure 9C:
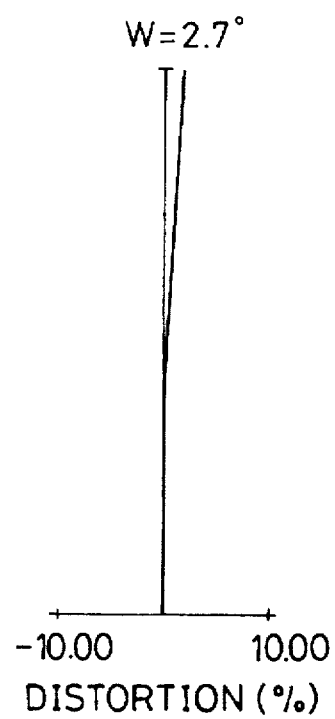
Figure 11A:
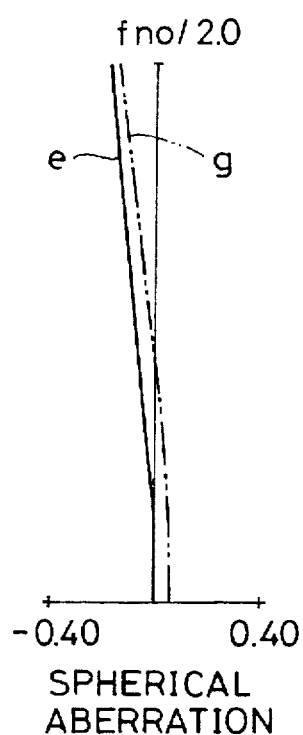
FIGS. 11A, 11B, and 11C illustrate graphs showing different aberrations in the first numerical example of the present invention, when the focal length f=117 and the object distance=0.9 m.
Figure 11B:
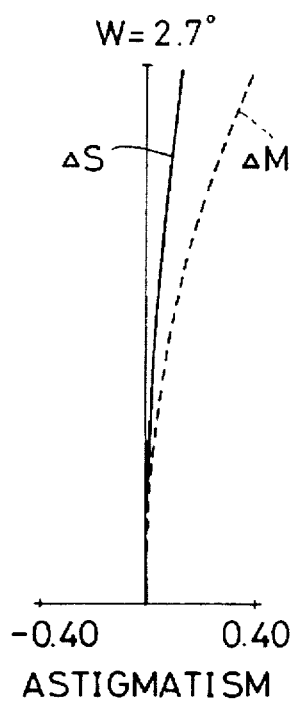
Figure 11C:
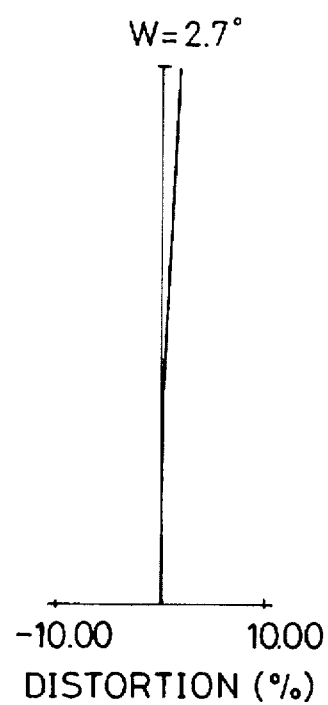
Figure 12A:
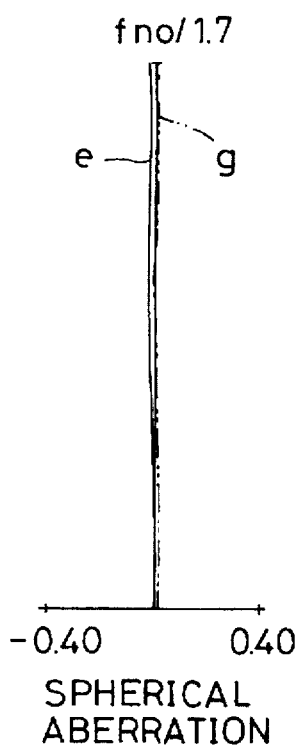
FIGS. 12A, 12B, and 12C illustrate graphs showing different aberrations in the second numerical example of the present invention, when the focal length f=8.5 and the object distance=3.0 m.
Figure 12B:
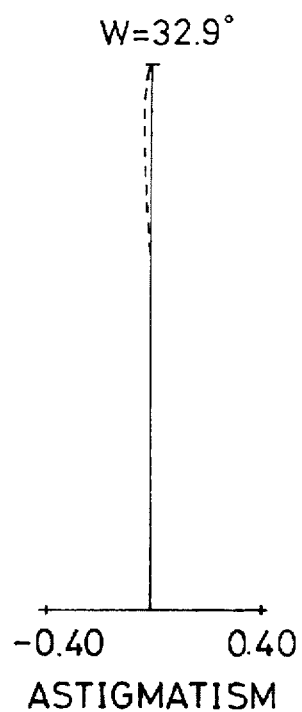
Figure 12C:
Figure 13A:
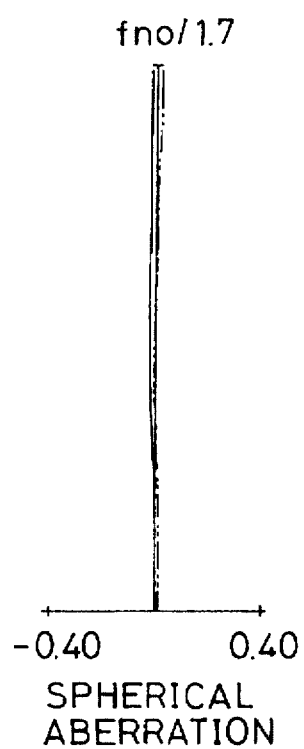
FIGS. 13A, 13B, and 13C illustrate graphs showing different aberrations in the second numerical example of the present invention, when the focal length f=17.0 and the object distance=3.0 m.
Figure 13B:
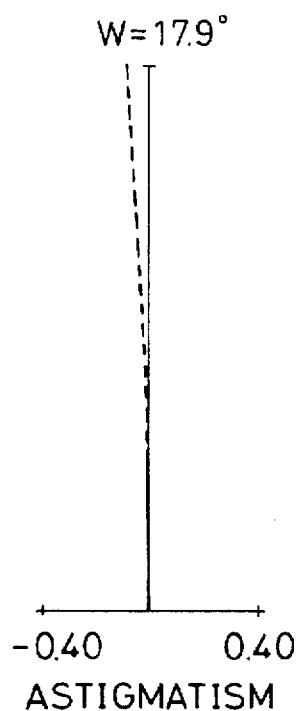
Figure 13C:
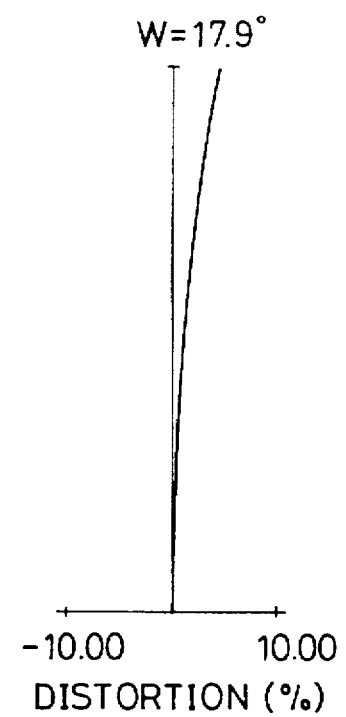
Figure 14A:
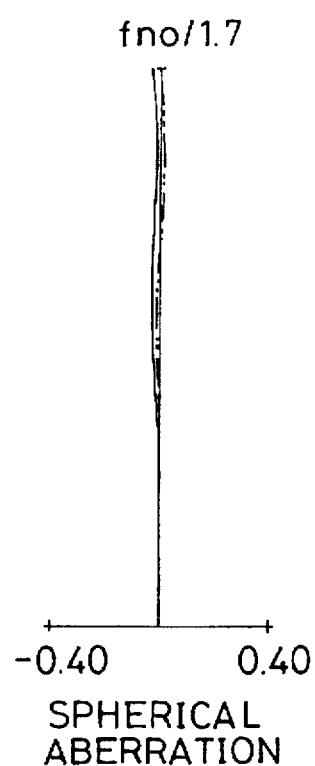
FIGS. 14A, 14B, and 14C illustrate graphs showing different aberrations in the second numerical example of the present invention, when the focal length f=34.0 and the object distance=3.0 m.
Figure 14B:
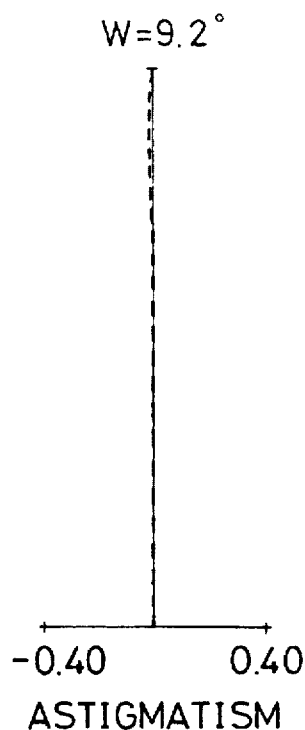
Figure 14C:
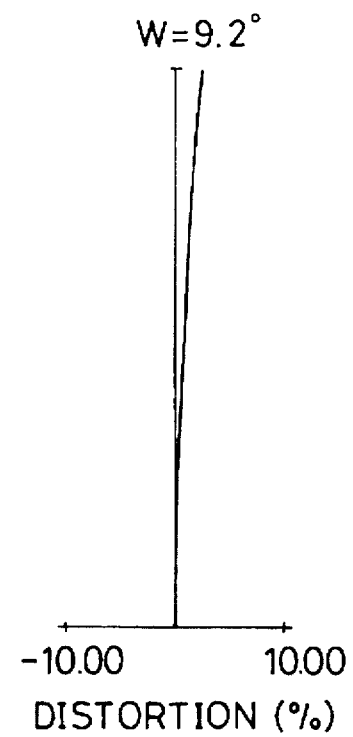
Figure 15A:
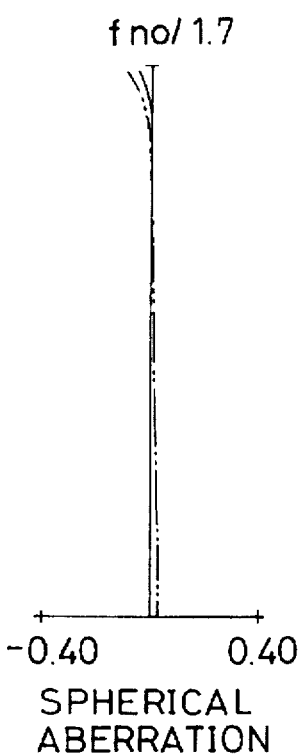
FIGS. 15A, 15B, and 15C illustrate graphs showing different aberrations in the second numerical example of the present invention, when the focal length f=68.0 and the object distance=3.0 m.
Figure 15B:
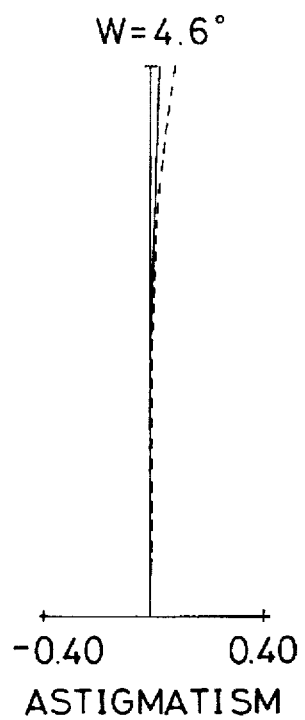
Figure 15C:
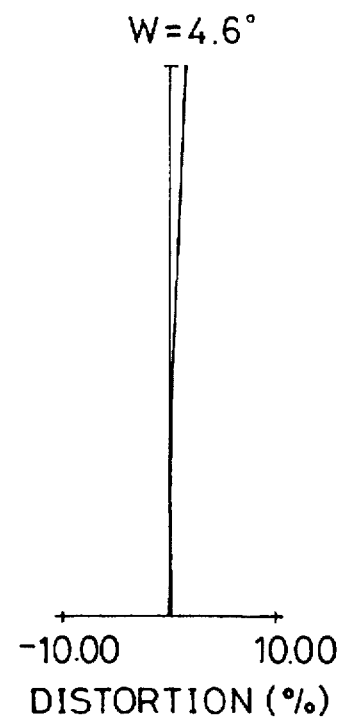
Figure 17A:
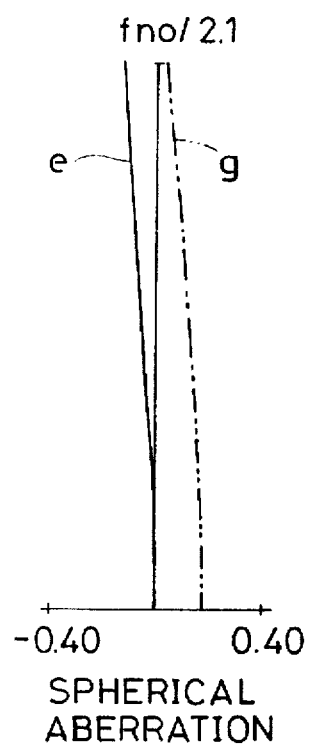
FIGS. 17A, 17B, and 17C illustrate graphs showing different aberrations in the second numerical example of the present invention, when the focal length f=127.5 and the object distance=infinity.
Figure 17B:
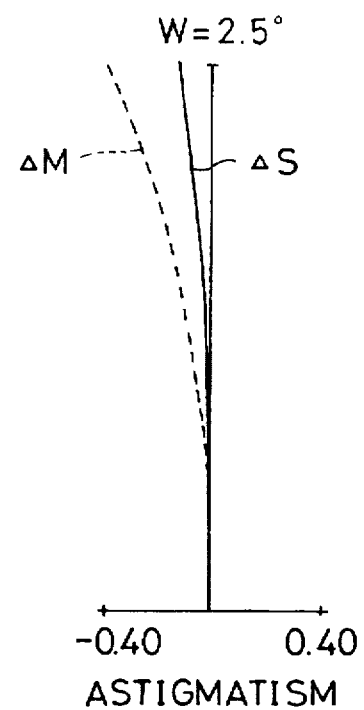
Figure 17C:
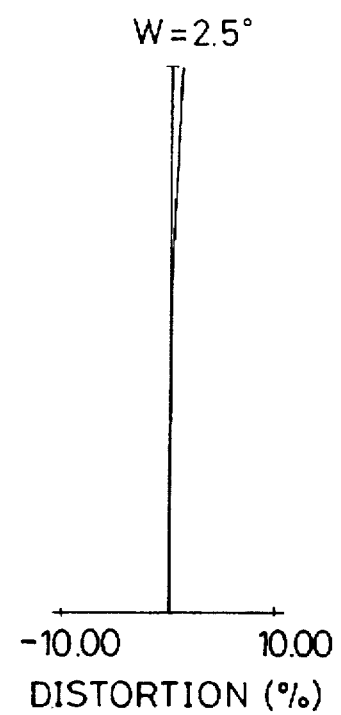
Figure 18A:
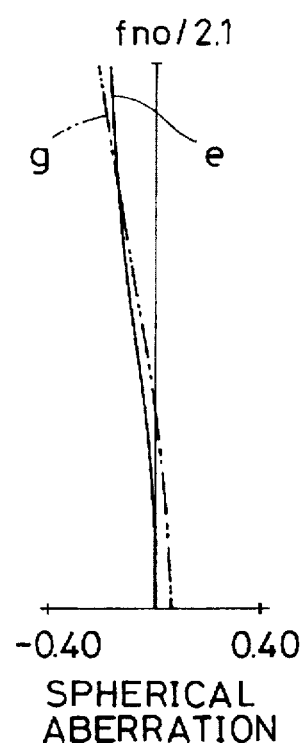
FIGS. 18A, 18B, and 18C illustrate graphs showing different aberrations in the second numerical example of the present invention, when the focal length f=127.5 and the object distance=0.9 m.
Figure 18B:
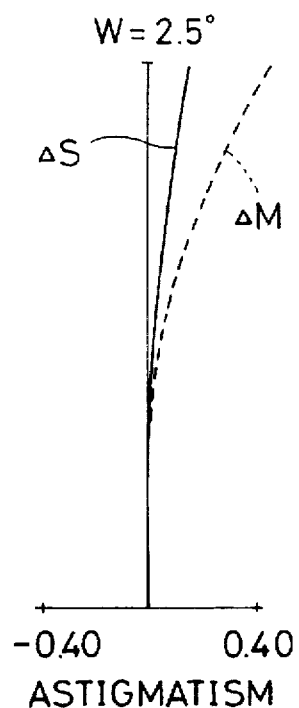
Figure 18C:
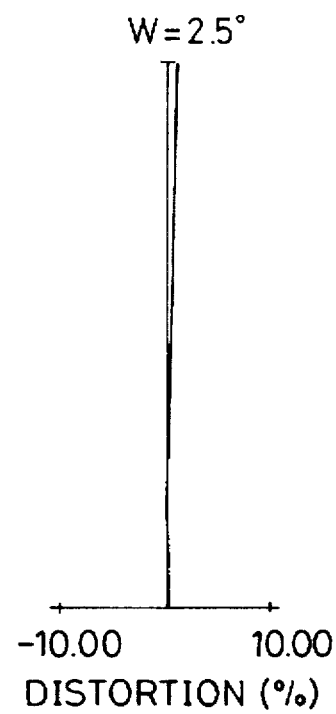
Figure 19A:
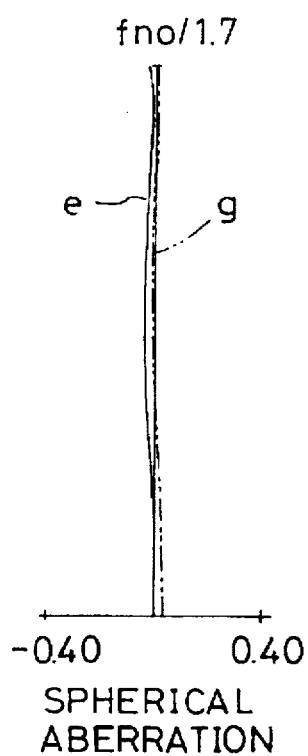
FIGS. 19A, 19B, and 19C illustrate graphs showing different aberrations in the third numerical example of the present invention, when the focal length f=8.0 and the object distance=3.0 m.
Figure 19B:
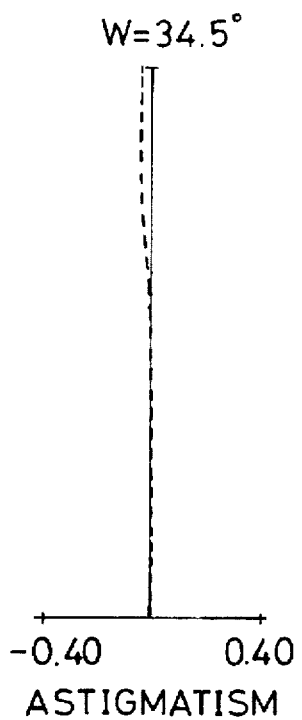
Figure 19C:
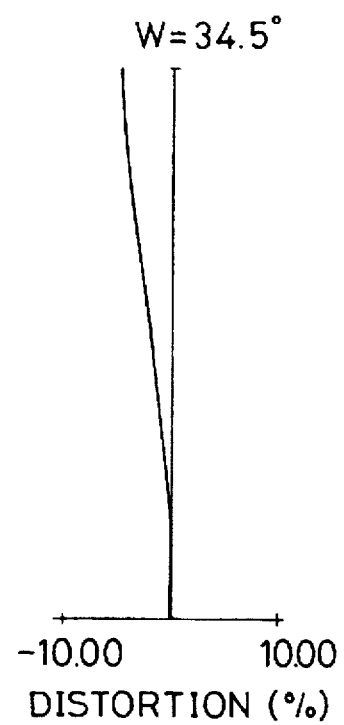
Figure 20A:
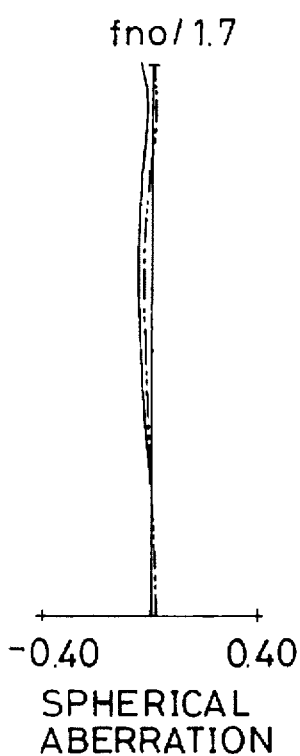
FIGS. 20A, 20B, and 20C illustrate graphs showing different aberrations in the third numerical example of the present invention, when the focal length f=16.0 and the object distance=3.0 m.
Figure 20B:
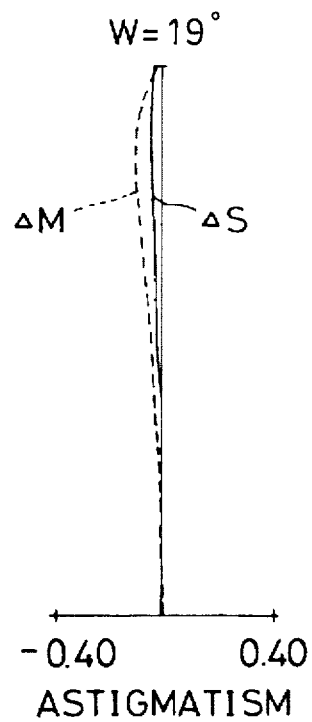
Figure 20C:
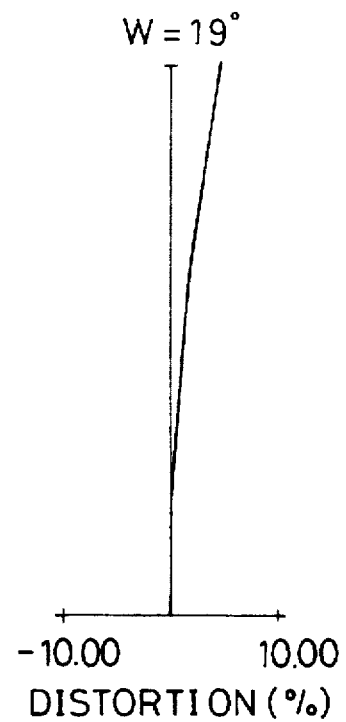
Figure 21A:
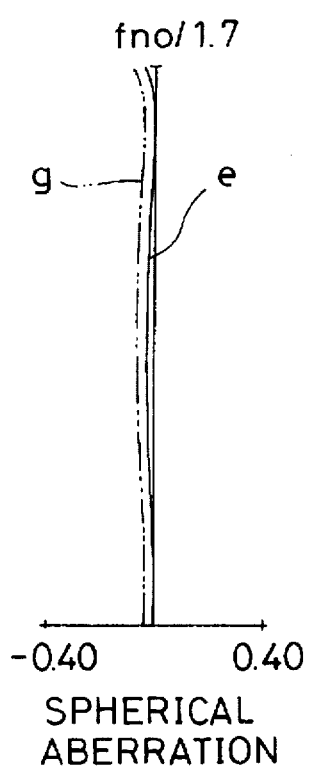
FIGS. 21A, 21B, and 21C illustrate graphs showing different aberrations in the third numerical example of the present invention, when the focal length f=48.0 and the object distance=3.0 m.
Figure 21B:
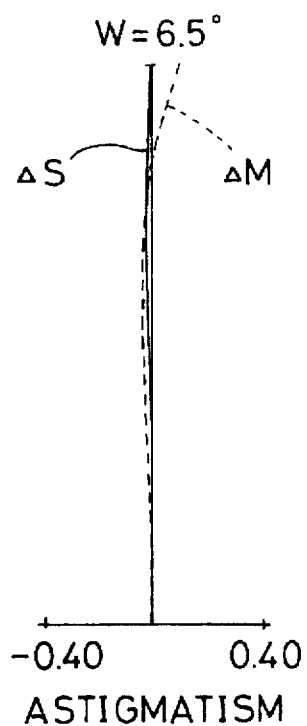
Figure 21C:
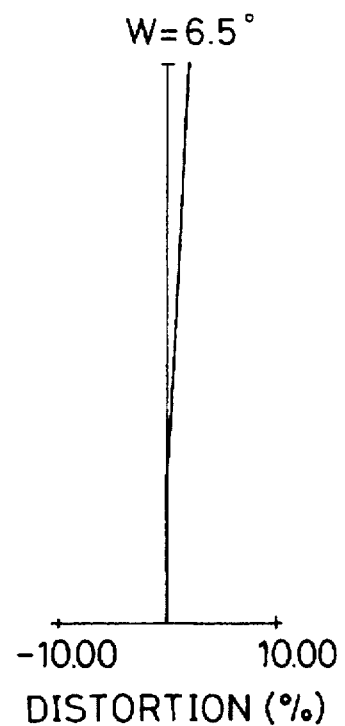
Figure 22A:
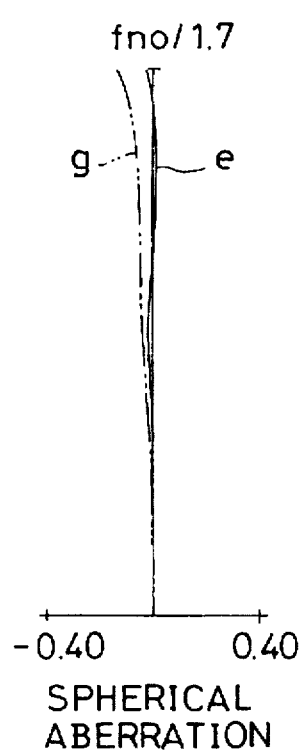
FIGS. 22A, 22B, and 22C illustrate graphs showing different aberrations in the third numerical example of the present invention, when the focal length f=96.0 and the object distance=3.0 m.
Figure 22B:
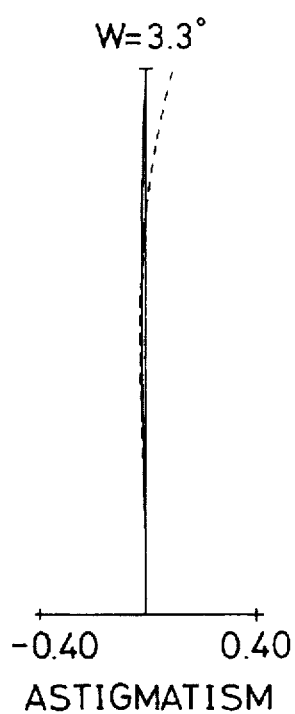
Figure 22C:
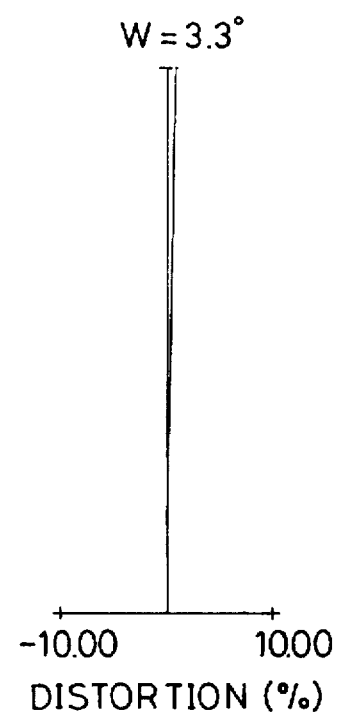
Figure 24A:
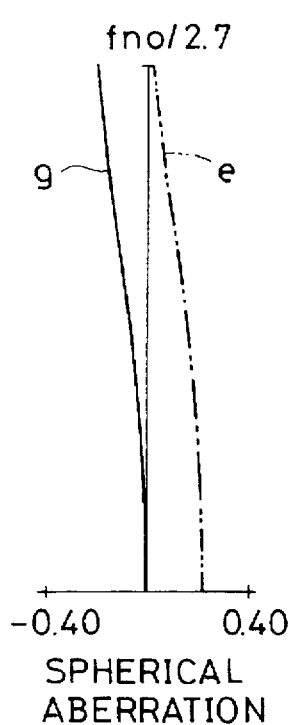
FIGS. 24A, 24B, and 24C illustrate graphs showing different aberrations in the third numerical example of the present invention, when the focal length f=160.0 and the object distance=infinity.
Figure 24B:
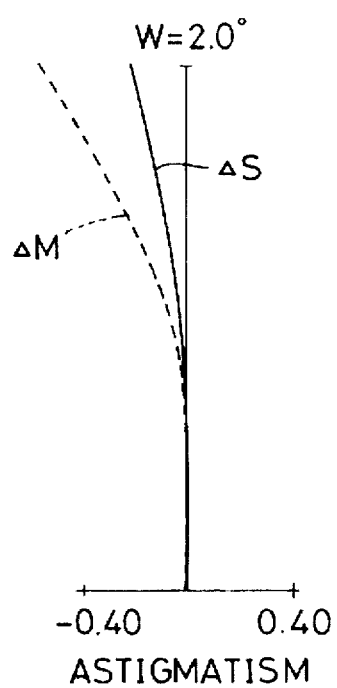
Figure 24C:
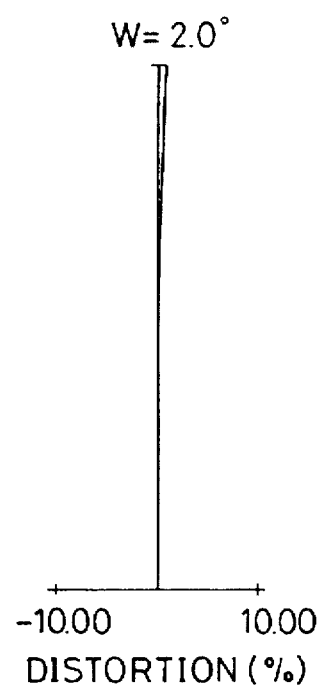
Figure 26A:
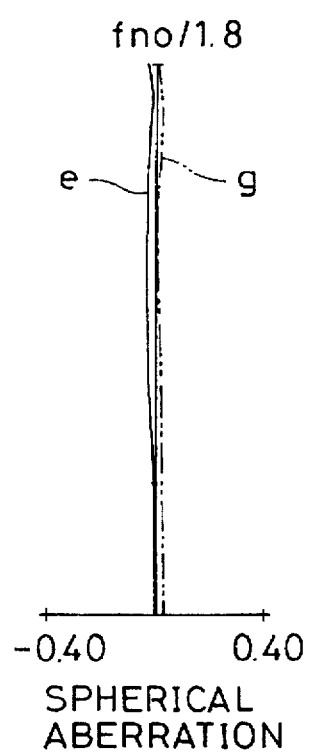
FIGS. 26A, 26B, and 26C illustrate graphs showing different aberrations in the fourth numerical example of the present invention, when the focal length f=10.0 and the object distance=10.0 m.
Figure 26B:
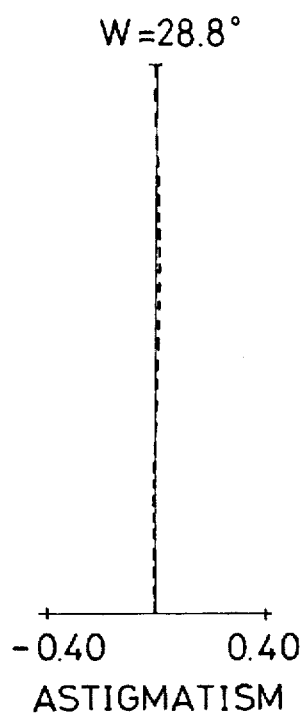
Figure 26C:
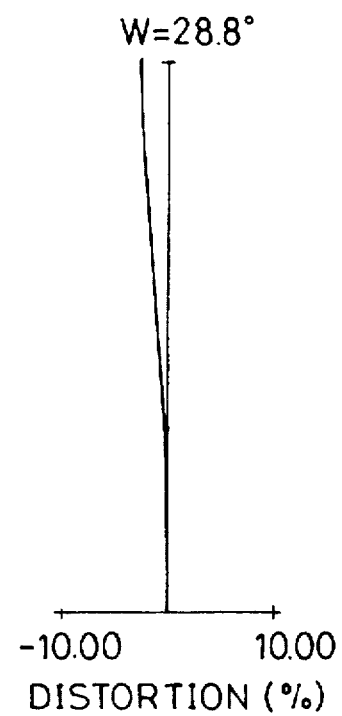
Figure 27A:
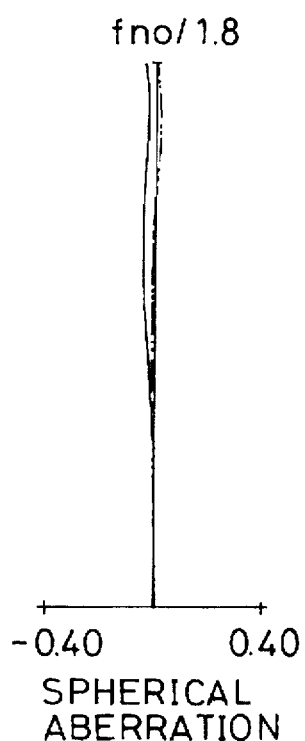
FIGS. 27A, 27B, and 27C illustrate graphs showing different aberrations in the fourth numerical example of the present invention, when the focal length f=19.49 and the object distance=10.0 m.
Figure 27B:
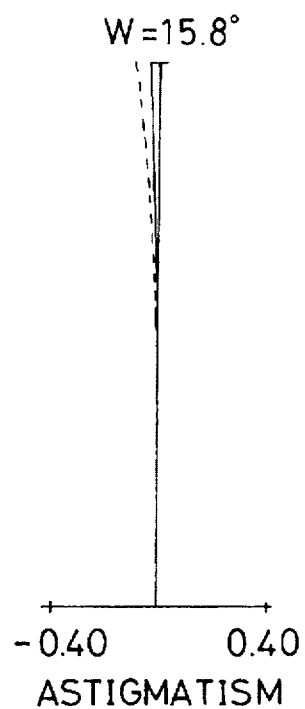
Figure 27C:
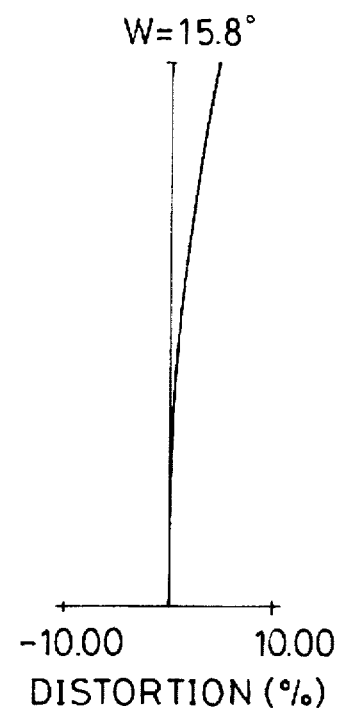
Figure 28A:
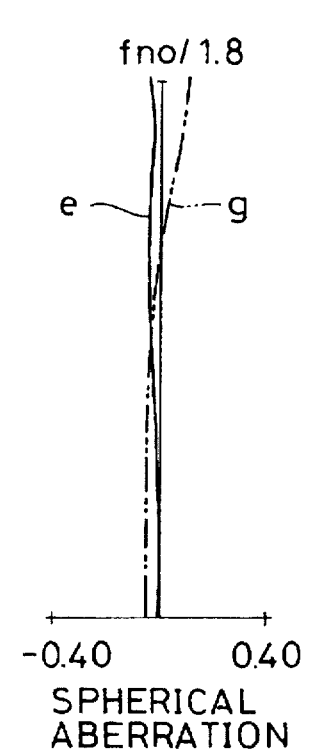
FIGS. 28A, 28B, and 28C illustrate graphs showing different aberrations in the fourth numerical example of the present invention, when the focal length f=69.79 and the object distance=10.0 m.
Figure 28B:
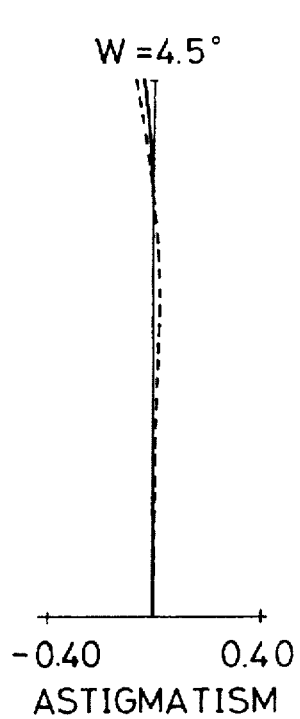
Figure 28C:
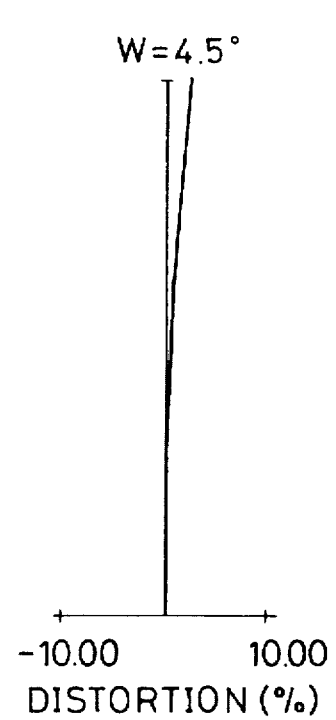
Figure 29A:
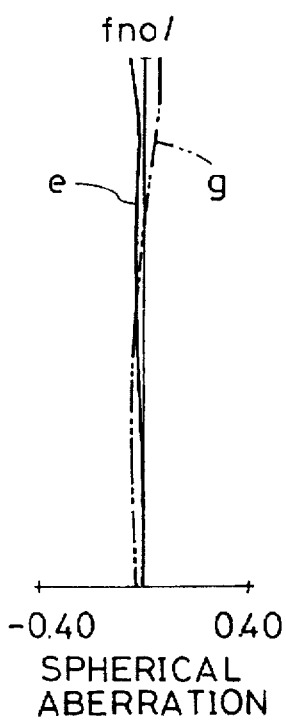
FIGS. 29A, 29B, and 29C illustrate graphs showing different aberrations in the fourth numerical example of the present invention, when the focal length f=257.37 and the object distance=10.0 m.
Figure 29B:
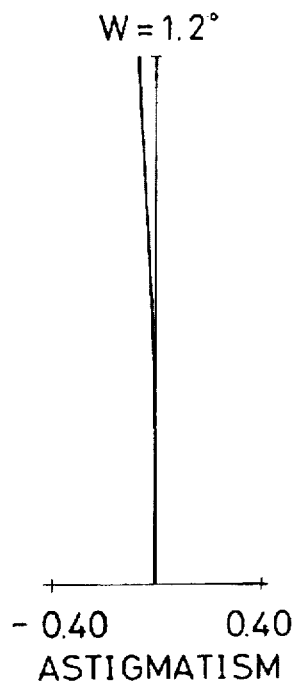
Figure 29C:
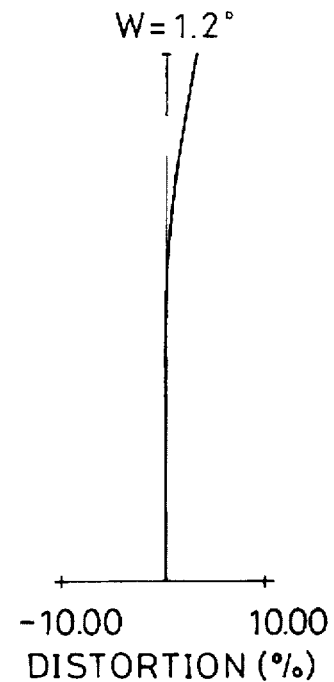
Figure 30A:
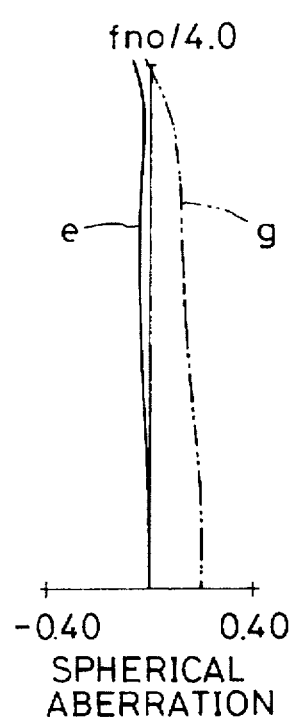
FIGS. 30A, 30B, and 30C illustrate graphs showing different aberrations in the fourth numerical example of the present invention, when the focal length f=441.10 and the object distance=10.0 m.
Figure 30B:
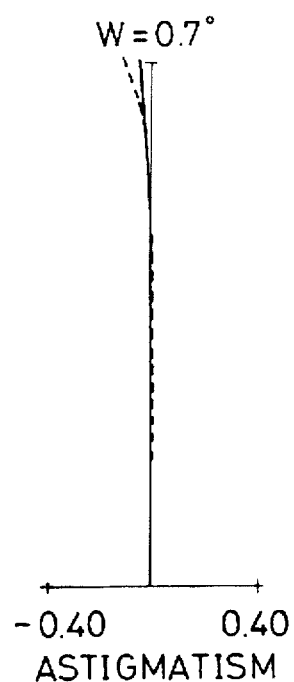
Figure 30C:
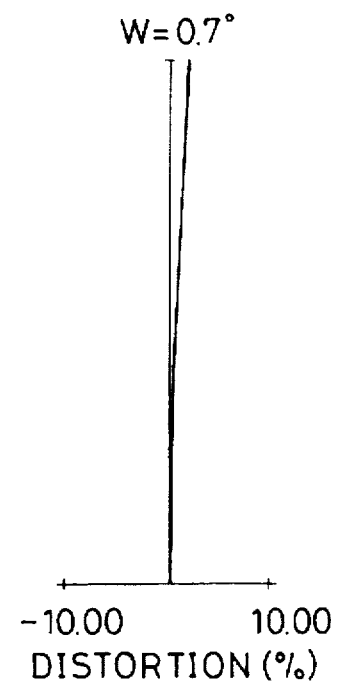
Figure 31A:
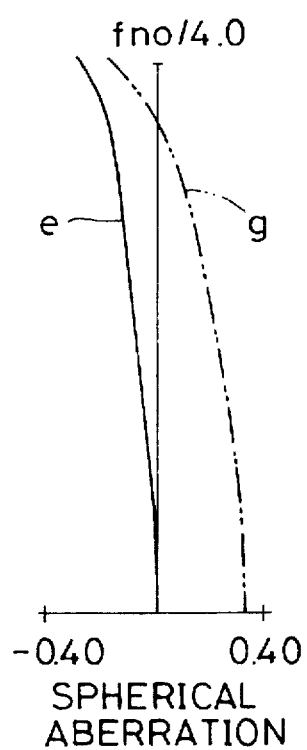
FIGS. 31A, 31B, and 31C illustrate graphs showing different aberrations in the fourth numerical example of the present invention, when the focal length f=441.10 and the object distance=infinity.
Figure 31B:
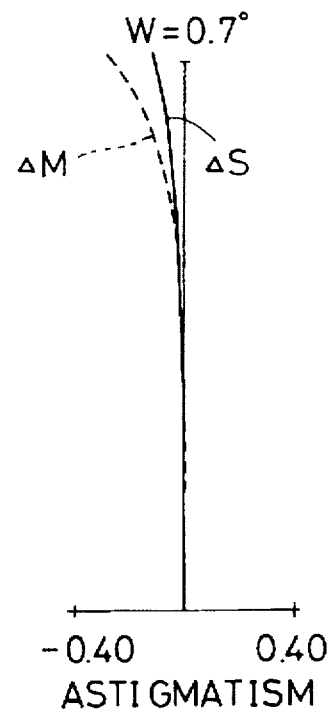
Figure 31C:
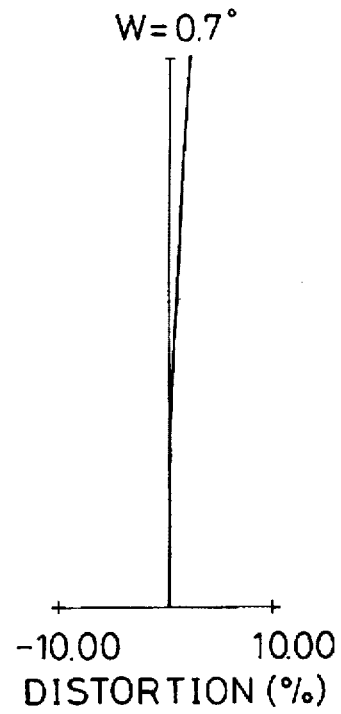
Figure 32A:
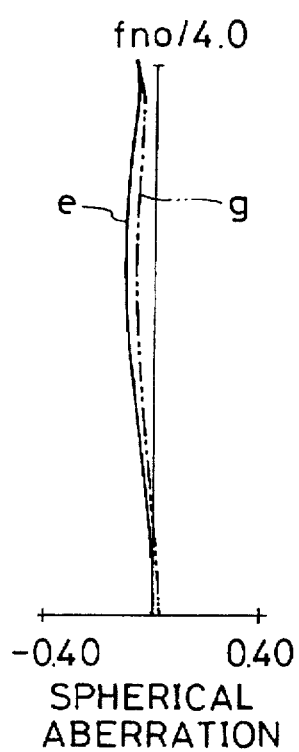
FIGS. 32A, 32B, and 32C illustrate graphs showing different aberrations in the fourth numerical example of the present invention, when the focal length f=441.10 and the object distance=3.4 m.
Figure 32B:
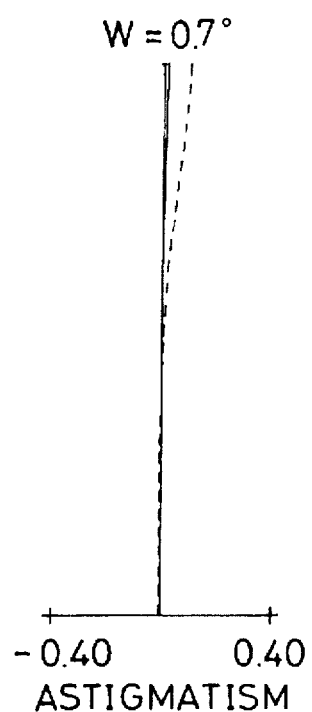
Figure 32C:
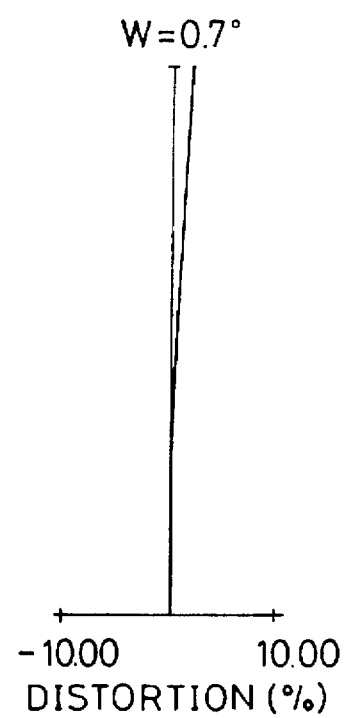
Figure 33:
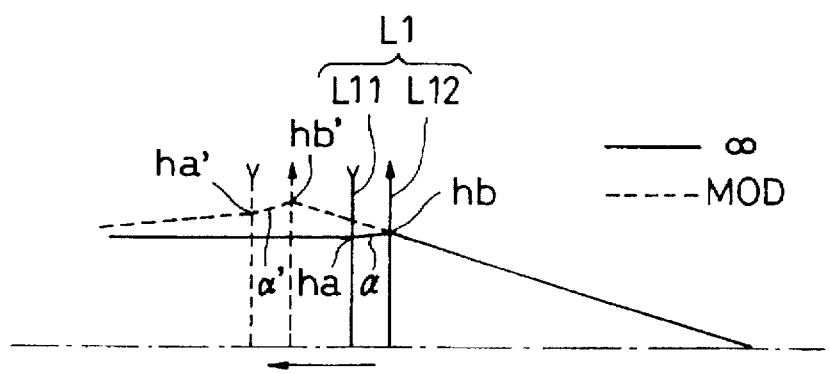
FIG. 33 illustrates the paraxial refractive powers and the arrangement of the lens subunits of the first lens unit of a conventional zoom lens device composed of four lens units.
Figure 34A:
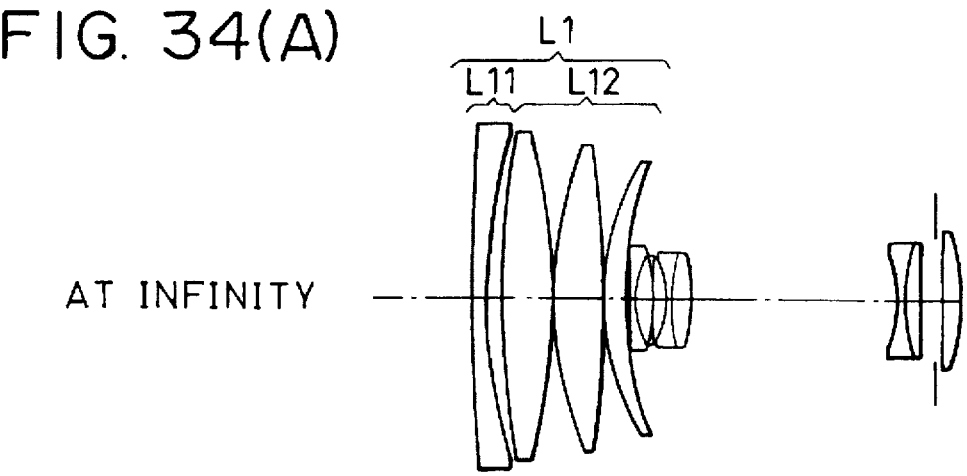
FIGS. 34(A) and 34(B) are cross sectional views of the first lens unit of the conventional zoom lens device composed of four lens units.
Figure 34B:
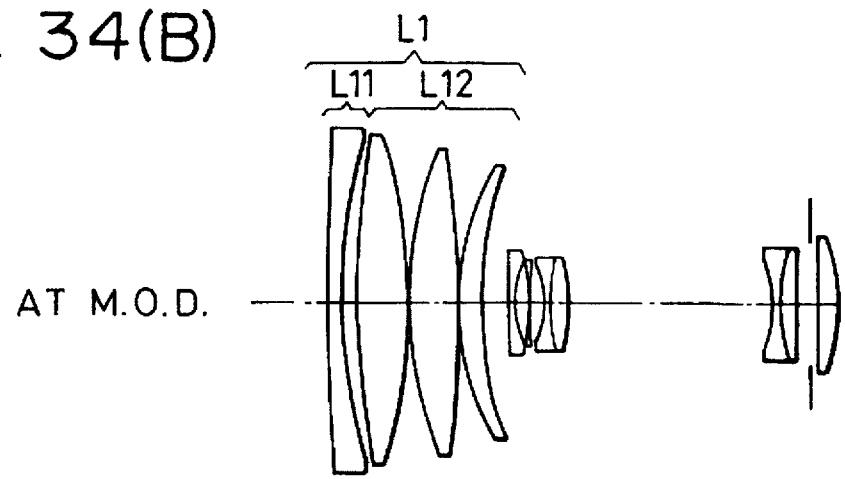

The zoom lens device of the fourth numerical example illustrated in FIG. 4, though having a field angle at the wide angle end of about $2\omega=57.6°$, has a zoom ratio of 44 and a field angle at the telephoto end of $2\omega=1.4°$, thus making it a zoom lens device with a very high magnification.

The zoom lens device has a very long focal length at the telephoto end, making it difficult to correct spherical as well as axial chromatic aberrations. In addition, a zoom ratio of 44 makes it difficult to correct the various aberration changes that occur at a result of zooming.

Accordingly, the zoom lens device of the present example is not a wide angle zoom lens device, but is one that uses a negative lens with a relative high refractive index and three positive lenses in the focusing movable rear lens subunit in order to obtain similar effects as the zoom lens device of the third numerical example. In the compensator C, the R28 surface is formed into a nonspherical surface in order to correct, in particular, spherical aberration at the telephoto side. Achromatization is enhanced by using a positive lens element made of material with a very large Abbe constant in the focusing movable rear lens subunit just as in the focusing stationary front lens subunit. With such an arrangement of lenses, aberrations are corrected to obtain good optical properties at the telephoto end with a very large focal point.

In addition, the negative lens in the rear lens subunit is a negative meniscus lens with the surface nearer the object being concave-shaped, so that corrections can primarily be made in the aberrations caused by nonaxial rays such as curvature of field and distortion.

Here, $v_{11}-v_{21}=-57.93$ and $v_{11}-v_{21}=-12.43$, so that, in particular, the secondary spectrum due to axial chromatic aberration at the telephoto end is greatly reduced. The axial chromatic aberration at the telephoto end of the zoom lens device in the fourth example is corrected by an amount such that the secondary spectrum is about the same as compared to the secondary spectrum of the zoom lens device of the first to third examples, even when its focal length is three times that of the other zoom lens devices.

As can be understood from the foregoing description, in the so-called four lens unit zoom lens device, the front first lens unit is formed such that its refractive power, f-number, and the like are of the proper value, the first lens unit is divided into a focusing stationary front lens subunit and a focusing movable rear lens subunit, the lens elements are properly arranged, and the refractive power and the achromatizing function of each lens are set such as to satisfy the predetermined conditions. Therefore, less changes occur in spherical aberration and chromatic aberration that occur as a result of zooming and focusing. In addition, changes in nonaxial aberrations such as astigmatism and curvature of field can be properly corrected. This makes it possible to produce a zoom lens device having excellent optical properties over the entire zooming and focusing ranges and having large aperture with an f-number of about 1.7 and a high zoom ratio of about 13 to 44.

According to the present invention, the same effects can be obtained with a zoom lens device in which part of the relay unit is moved in accordance with the zooming.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising in order from object side to image side of said zoom lens:

a first lens unit having a positive refractive power;

a second lens unit for changing magnification and having a negative refractive power;

a third lens unit for correcting changes in an image plane which occur as the magnification changes; and a fourth lens unit for forming an image.

wherein said first lens unit comprises (i) a front lens subunit which is stationary during focusing and (ii) a rear lens subunit which is movable for focusing, said front lens subunit comprising a negative lens and a positive lens, and said rear lens subunit comprising a negative lens, being the closest or second closest of all lenses of said rear lens subunit to the object side of said rear lens subunit, and at least two positive lenses positioned on the image side of said negative lens.

2. A zoom lens device according to claim 1, wherein said negative lens of said rear lens subunit is joined to one of said at least two positive lenses therein.

3. A zoom lens device according to claim 1, wherein said negative lens of said rear lens subunit is separated by an air gap from a positive lens of said rear lens subunit.

4. A zoom lens device according to claim 1, wherein said rear lens subunit comprises said negative lens and three positive lenses.

5. A zoom lens device according to claim 1, wherein said rear lens subunit consists of said negative lens and two positive lenses.

6. A zoom lens device according to claim 1, wherein said rear lens subunit consists of said negative lens and three positive lenses.

7. A zoom lens device according to claim 1, wherein said negative lens of said rear lens subunit is a negative meniscus lens with a surface nearer to the object side being concave shaped.

8. A zoom lens device according to claim 1, wherein said negative lens of said rear lens subunit is closest, of all lenses of said rear lens subunit, to the object side of said rear lens subunit.

9. A zoom lens device according to claim 1, wherein said negative lens of said rear lens subunit is second closest, of all lenses of said rear lens subunit, to the object side of said rear lens subunit.

10. A zoom lens device according to claim 1, wherein said negative lens and said positive lens of said front lens subunit are separate lenses.

11. A zoom lens device according to claim 10, wherein said front lens subunit has an air lens defined by a space between said negative lens and said positive lens of said front lens subunit, said air lens being defined by a radius of curvature of said negative lens at an image side of said negative lens and by a radius of curvature of said positive lens at an object side of said positive lens, wherein an object side of said air lens is a convex shaped positive meniscus lens with substantially equal radius of curvature.

12. A zoom lens device according to claim 1, wherein said third lens unit has a negative refractive power.

13. A zoom lens device according to claim 1, wherein said third lens unit has a positive refractive power.

14. A zoom lens according to claim 1, wherein said front lens subunit has a negative refractive power.

15. A zoom lens according to claim 1, wherein when Abbe constants of said negative lens and said positive lens of said front lens subunit are $v_{11N}$ and $v_{12P}$, respectively, the condition $v_{11N} - v_{12P} < -55$ is satisfied.

16. A zoom lens according to claim 1, wherein when an Abbe constant of said negative lens of said front lens subunit is $v_{11N}$, and when an Abbe constant of said negative lens of said rear lens subunit is $v_{21N}$, the condition $v_{11N} - v_{21N} < -10$ is satisfied.

17. A zoom lens according to claim 1, wherein when focal lengths of said rear lens subunit and said negative lens of said rear lens subunit are Fc12 and $F_{21}$, respectively, the condition $-6.5 < F_{21}/Fc12 < -3.5$ is satisfied.

18. A zoom lens according to claim 1, wherein among indices of refraction of material of said negative lens of said rear lens subunit, those in terms of d line with a wavelength of 587.56 nm, g line with a wavelength of 435.83 nm, F line with a wavelength of 486.13 nm, and C line with a wavelength of 656.27 nm are nd, ng, nF, and nC, respectively, the condition $$Pdg=(ng-nd)/(nF-nC)<1.36-0.00208\times v_{21N}$$

is satisfied, wherein $v_{21N}$ is an Abbe constant of material of said negative lens of said rear lens subunit.

19. A zoom lens according to claim 1, wherein when radii of curvature of said negative lens of said rear lens subunit at the object side of said negative lens and an image side of said negative lens are ra and rb, respectively, the condition $$1.1 < \left| \frac{rb+ra}{rb-ra} \right| < 5.6$$

is satisfied.

20. A zoom lens according to claim 17, wherein when a focal length and an f-number of said zoom lens at a telephoto end are FT and FNT, respectively, and when a focal length of said first lens unit is F1, the conditions 1.0<FN1<1.7, where FN1=F1/(FT/FNT), and 0.9<Fc12/F1<1.1 are satisfied.

* * * * *

UNITED STATES PATENT AND TRADEMARK OFFICE
CERTIFICATE OF CORRECTION

PATENT NO.   : 5,737,128
DATED        : April 7, 1998
INVENTOR(S)  : Fumiaki USUI It is certified that error appears in the above-identified patent and that said Letters Patent is hereby corrected as shown below:

COLUMN 3:

Line 27, "M.O.D" should read --M.O.D.--.

COLUMN 6:

Line 50, "first" (second occurrence) should be deleted.

COLUMN 12:

Line 8, "is a much" should read --is much--.

COLUMN 14:

Line 63, "n6 = 1.88815" should read --n6 = 1.88814--.

COLUMN 15:

Line 11, "r24 = "60.368" should read --r24 = -60.368--.
    Line 53, "d13 = 0.980" should read --d13 = 0.90--.

UNITED STATES PATENT AND TRADEMARK OFFICE
CERTIFICATE OF CORRECTION

PATENT NO.   : 5,737,128

DATED        : April 7, 1998

INVENTOR(S)  : Fumiaki USUI

It is certified that error appears in the above-identified patent and that said Letters Patent is hereby corrected as shown below:

COLUMN 17:

Line 51, "r36 = "67.344" should read --r36 =-67.344--.

Signed and Sealed this

Twentieth Day of April, 1999

Attest:

Q. TODD DICKINSON

Attesting Officer

Acting Commissioner of Patents and Trademarks